(12) United States Patent
Hendry

(10) Patent No.: US 12,388,982 B2
(45) Date of Patent: *Aug. 12, 2025

(54) IMAGE DECODING METHOD AND APPARATUS THEREFOR

(71) Applicant: LG Electronics Inc., Seoul (KR)

(72) Inventor: Hendry Hendry, Seoul (KR)

(73) Assignee: LG Electronics Inc., Seoul (KR)

( * ) Notice: Subject to any disclaimer, the term of this patent is extended or adjusted under 35 U.S.C. 154(b) by 22 days.

This patent is subject to a terminal disclaimer.

(21) Appl. No.: 18/484,836

(22) Filed: Oct. 11, 2023

(65) Prior Publication Data

US 2024/0056567 A1 Feb. 15, 2024

Related U.S. Application Data

(63) Continuation of application No. 17/974,155, filed on Oct. 26, 2022, now Pat. No. 11,825,080, which is a continuation of application No. PCT/KR2021/005508, filed on Apr. 30, 2021.

(60) Provisional application No. 63/019,438, filed on May 4, 2020.

(51) Int. Cl.
| | |
|---|---|
| *H04N 19/105* | (2014.01) |
| *H04N 19/186* | (2014.01) |
| *H04N 19/187* | (2014.01) |
| *H04N 19/70* | (2014.01) |

(52) U.S. Cl.
CPC ......... *H04N 19/105* (2014.11); *H04N 19/186* (2014.11); *H04N 19/187* (2014.11); *H04N 19/70* (2014.11)

(58) Field of Classification Search
CPC .. H04N 19/105; H04N 19/186; H04N 19/187; H04N 19/70
See application file for complete search history.

(56) References Cited

U.S. PATENT DOCUMENTS

| | | | |
|---|---|---|---|
| 2015/0016532 A1* | 1/2015 | Chen | H04N 19/597 375/240.16 |
| 2015/0365702 A1* | 12/2015 | Deshpande | H04N 19/30 375/240.25 |
| 2015/0373361 A1 | 12/2015 | Wang et al. | |

(Continued)

FOREIGN PATENT DOCUMENTS

CN 106464916 A 2/2017

OTHER PUBLICATIONS

Notice of Allowance in Chinese Appln. No. 202180032947.9, mailed on Oct. 31, 2024, 7 pages (with English translation).

*Primary Examiner* — Jae N Noh
(74) *Attorney, Agent, or Firm* — Fish & Richardson P.C.

(57) ABSTRACT

An image decoding method performed by a decoding apparatus, according to the present document, comprises the steps of: deriving a multilayer output layer set (OLS) index of a target OLS in a list of multilayer OLSs; acquiring hypothetical reference decoder (HRD)-related information and decoded picture buffer (DPB)-related information for the target OLS, on the basis of the multilayer OLS index; and decoding a picture within the target OLS, on the basis of the HRD-related information and the DPB-related information, wherein the multilayer OLSs are OLSs including a plurality of layers, and the target OLS is one of the multilayer OLSs.

11 Claims, 8 Drawing Sheets

(56) References Cited

U.S. PATENT DOCUMENTS

2016/0212439 A1 7/2016 Hannuksela
2016/0255373 A1 9/2016 Deshpande

* cited by examiner

IMAGE DECODING METHOD AND APPARATUS THEREFOR

CROSS-REFERENCE TO RELATED APPLICATIONS

This application is a continuation of U.S. application Ser. No. 17/974,155, filed on Oct. 26, 2022, which is a continuation of International Application No. PCT/KR2021/005508, filed on Apr. 30, 2021, which claims the benefit of U.S. Provisional Application No. 63/019,438, filed on May 4, 2020. The disclosures of the prior applications are incorporated by reference in their entirety.

TECHNICAL FIELD

The present disclosure relates to an image coding technology and, most particularly, to an image decoding method and apparatus for coding video information including HRD related syntax elements and/or DPB related syntax elements using a multi-layer OLS index for multi-layer OLSs in an image coding system.

BACKGROUND

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

SUMMARY

The present disclosure provides a method and apparatus for improving image coding efficiency.

Another technical object of the present disclosure is to provide a method and apparatus for signaling HRD related syntax elements and/or DPB related syntax elements for a multi-layer OLS.

According to an embodiment of the present specification, provided herein is an image decoding method performed by a decoding apparatus. The method may include the steps of deriving a multi-layer Output Layer Set (OLS) index of a target OLS in a list of multi-layer OLSs, obtaining Hypothetical Reference Decoder (HRD) related information and Decoded Picture Buffer (DPB) related information for the target OLS based on the multi-layer OLS index, and decoding a picture in the target OLS based on the HRD related information and the DPB related information, wherein the multi-layer OLSs may be OLSs including a plurality of layers, and wherein the target OLS may be one of the multi-layer OLSs.

According to another embodiment of the present specification, provided herein is a decoding apparatus performing image decoding. The decoding apparatus may include an entropy decoder deriving a multi-layer Output Layer Set (OLS) index of a target OLS in a list of multi-layer OLSs and obtaining Hypothetical Reference Decoder (HRD) related information and Decoded Picture Buffer (DPB) related information for the target OLS based on the multi-layer OLS index, and a DPB decoding a picture in the target OLS based on the HRD related information and the DPB related information, wherein the multi-layer OLSs may be OLSs including a plurality of layers, and wherein the target OLS may be one of the multi-layer OLSs.

According to yet another embodiment of the present specification, provided herein is an image encoding method performed by an encoding apparatus. The method may include the steps of deriving a multi-layer Output Layer Set (OLS) index of a target OLS in a list of multi-layer OLSs, generating Hypothetical Reference Decoder (HRD) related information and Decoded Picture Buffer (DPB) related information for the target OLS based on the multi-layer OLS index, and encoding video information including the HRD related information and the DPB related information, wherein the multi-layer OLSs may be OLSs including a plurality of layers, and wherein the target OLS may be one of the multi-layer OLSs.

According to yet another embodiment of the present specification, provided herein is an encoding apparatus. The encoding apparatus may include an entropy encoder deriving a multi-layer Output Layer Set (OLS) index of a target OLS in a list of multi-layer OLSs, generating Hypothetical Reference Decoder (HRD) related information and Decoded Picture Buffer (DPB) related information for the target OLS based on the multi-layer OLS index, and encoding video information including the HRD related information and the DPB related information, wherein the multi-layer OLSs may be OLSs including a plurality of layers, and wherein the target OLS may be one of the multi-layer OLSs.

According to yet another embodiment of the present specification, provided herein is a non-transitory computer-readable storage medium storing a bitstream causing a decoding apparatus to perform the steps of deriving a multi-layer Output Layer Set (OLS) index of a target OLS in a list of multi-layer OLSs, obtaining Hypothetical Reference Decoder (HRD) related information and Decoded Picture Buffer (DPB) related information for the target OLS based on the multi-layer OLS index, and decoding a picture in the target OLS based on the HRD related information and the DPB related information, wherein the multi-layer OLSs may be OLSs including a plurality of layers, and wherein the target OLS may be one of the multi-layer OLSs.

According to the present disclosure, the signaling of HRD related information and DPB related information may be efficiently performed by deriving indexes of a list of multi-layer OLSs among all OLSs. And, thus, the overall coding efficiency may be enhanced.

According to the present disclosure, the mapping of HRD related information and DPB related information that are signaled only for multi-layer OLSs to a wrong (or incorrect) OLS may be prevented by deriving indexes of a list of multi-layer OLSs among all OLSs. And, thus, the overall coding efficiency may be enhanced.

DETAILED DESCRIPTION

Figure 1:
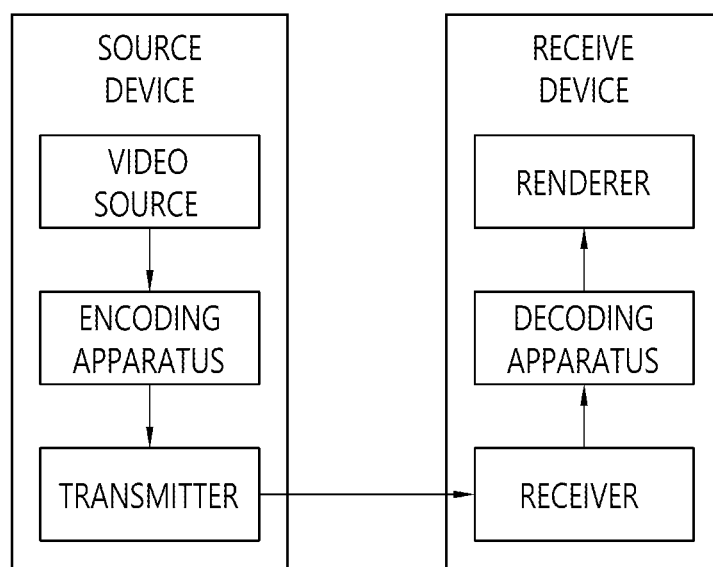
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bit stream.

The transmitter may transmit the encoded image/image information or data output in the form of a bit stream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bit stream and transmit the received bit stream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (e.g., H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, a subpicture may represent a rectangular region of one or more slices within a picture. That is, a subpicture contains one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (e.g., cb, cr) blocks. The unit may be used interchangeably with terms such as block or area in some cases. In a general case, an M×N block may include samples (or sample arrays) or a set (or array) of transform coefficients of M columns and N rows.

In the present description, "A or B" may mean "only A", "only B" or "both A and B". In other words, in the present specification, "A or B" may be interpreted as "A and/or B". For example, "A, B or C" herein means "only A", "only B", "only C", or "any and any combination of A, B and C".

A slash (/) or a comma (comma) used in the present description may mean "and/or". For example, "A/B" may mean "A and/or B". Accordingly, "A/B" may mean "only A", "only B", or "both A and B". For example, "A, B, C" may mean "A, B, or C".

In the present description, "at least one of A and B" may mean "only A", "only B", or "both A and B". In addition, in the present description, the expression "at least one of A or B" or "at least one of A and/or B" may be interpreted the same as "at least one of A and B".

In addition, in the present description, "at least one of A, B and C" means "only A", "only B", "only C", or "any combination of A, B and C". Also, "at least one of A, B or C" or "at least one of A, B and/or C" may mean "at least one of A, B and C".

In addition, parentheses used in the present description may mean "for example". Specifically, when "prediction (intra prediction)" is indicated, "intra prediction" may be proposed as an example of "prediction". In other words, "prediction" in the present description is not limited to "intra prediction", and "intra prediction" may be proposed as an example of "prediction". Also, even when "prediction (i.e., intra prediction)" is indicated, "intra prediction" may be proposed as an example of "prediction".

In the present description, technical features that are individually described within one drawing may be implemented individually or may be implemented at the same time.

The following drawings were created to explain a specific example of the present description. Since the names of specific devices described in the drawings or the names of specific signals/messages/fields are presented by way of example, the technical features of the present description are not limited to the specific names used in the following drawings.

Figure 2:
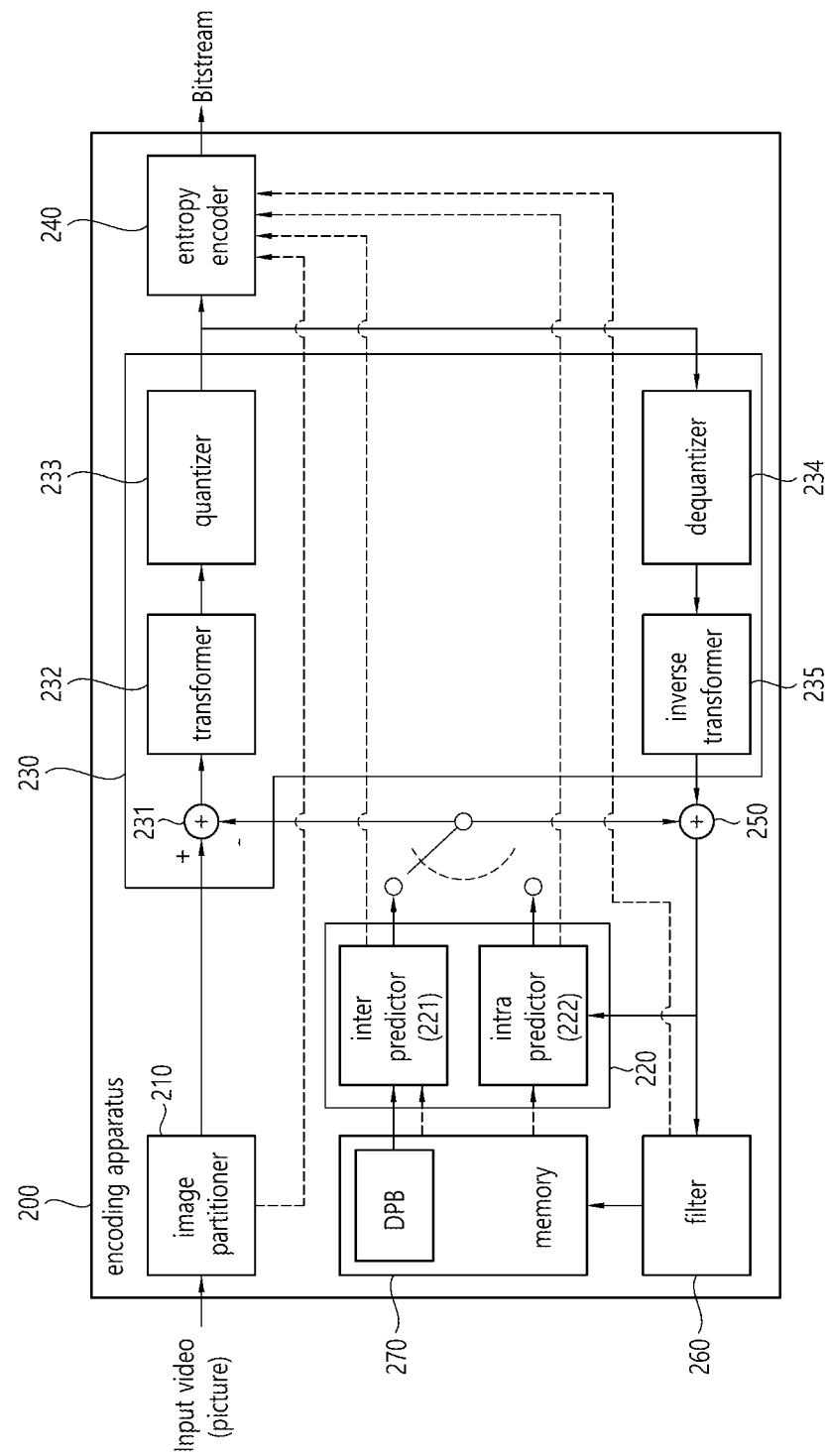
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (e.g., an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bit stream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-loeve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bit stream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g., values of syntax elements, etc.) together or separately. Encoded information (e.g., encoded video/image information) may be transmitted or stored in units of NALs (network abstraction layer) in the form of a bit stream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bit stream. The bit stream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bit stream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
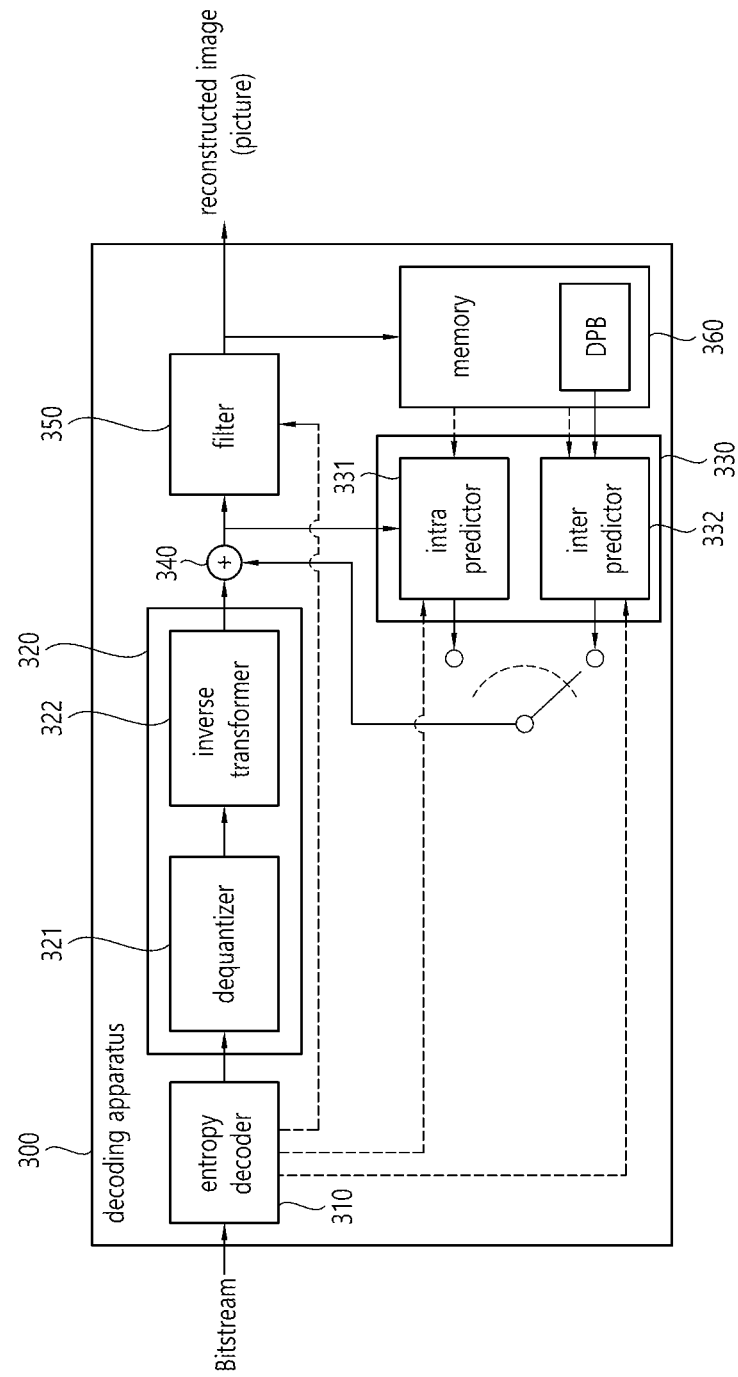
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (e.g., a decoder chipset or a processor) according to an embodiment. In addition, the memory 360 may include a decoded picture buffer (DPB) or may be configured by a digital storage medium. The hardware component may further include the memory 360 as an internal/external component.

When a bit stream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bit stream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bit stream, and the received signal may be decoded through the entropy decoder 310. For example, the entropy decoder 310 may parse the bit stream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bit stream. For example, the entropy decoder 310 decodes the information in the bit stream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bit stream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (e.g., quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

In the present disclosure, at least one of quantization/inverse quantization and/or transform/inverse transform may be omitted. When the quantization/inverse quantization is omitted, the quantized transform coefficients may be called transform coefficients. When the transform/inverse transform is omitted, the transform coefficients may be called coefficients or residual coefficients, or may still be called transform coefficients for uniformity of expression.

In the present disclosure, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or the information on the transform coefficient(s)), and scaled transform coefficients may be derived by inverse transforming (scaling) on the transform coefficients. Residual samples may be derived based on the inverse transforming (transforming) on the scaled transform coefficients. This may be applied/expressed in other parts of the present disclosure as well.

Meanwhile, video/image information may include information on a Decoded Picture Buffer (DPB) and/or information on a Hypothetical Reference Decoder (HRD) of an Output Layer Set (OLS). For example, the video/image information may include a Video Parameter Set (VPS), and the VPS may be a parameter set that is used for delivering (or transferring) the information on the DPB and/or the information on the HRD.

For example, the information on the DPB and/or the information on the HRD may be signaled for each OLS. Herein, the HRD may be a hypothetical decoder model designating constraints on variability of conforming network abstraction layer (NAL) unit streams or conforming byte streams that may be generated by an encoding process. When the HRD is present, the information on the HRD may be included in a VPS or Sequence Parameter Set (SPS). Additionally, the information on the DPB may be included in a VPS or Sequence Parameter Set (SPS), as shown below.

TABLE 1

| | Descriptor |
|---|---|
| video_parameter_set_rbsp( ) { | |
| ... | |
|   if( !vps_each_layer_is_an_ols_flag ) { | |
|     vps_num_dpb_params_minus1 | ue(v) |
|     if( vps_max_sublayers_minus1 > 0 ) | |
|       vps_sublayer_dpb_params_present_flag | u(1) |
|     for( i = 0; i < VpsNumDpbParams; i++ ) { | |
|       if( !vps_all_layers_same_num_sublayers_flag ) | |
|         vps_dpb_max_temporal_id[ i ] | u(3) |
|       dpb_parameters( vps_dpb_max_temporal_id[ i ], | |
|         vps_sublayer_dpb_params_present_flag ) | |
|     } | |
|     for( i = 0; i < NumMultiLayerOlss; i++ ) { | |
|       vps_ols_dpb_pic_width[ i ] | ue(v) |
|       vps_ols_dpb_pic_height[ i ] | ue(v) |
|       vps_ols_dpb_chroma_format[ i ] | u(2) |
|       vps_ols_dpb_bitdepth_minus8 [ i ] | ue(v) |
|       if( VpsNumDpbParams > 1 && vps_num_dpb_params != NumMultiLayerOlss ) | |
|         vps_ols_dpb_params_idx[ i ] | ue(v) |
|     } | |
|     vps_general_hrd_params_present_flag | u(1) |
|   } | |
|   if( vps_general_hrd params present_flag ) { | |
|     general_hrd_parameters( ) | |
|     if( vps_max_sublayers_minus1 > 0 ) | |
|       vps_sublayer_cpb_params_present_flag | u(1) |
|     vps_num_ols_hrd_params_minus1 | ue(v) |
|     for( i = 0; i <= vps_num_ols_hrd_params_minus1; i++ ) { | |
|       if( !vps_all_layers_same_num_sublayers_flag ) | |
|         hrd_max_tid[ i ] | u(3) |
|       firstSubLayer = vps_sublayer_cpb_params_present_flag ? 0 : vps_hrd_max_tid[ i ] | |
|       ols_hrd_parameters( firstSubLayer, vps_hrd_max_tid[ i ] ) | |
|     } | |
|     if( vps_num_ols_hrd_params_minus1 > 0 && | |

TABLE 1-continued

|  | Descriptor |
|---|---|
| ```
        vps_num_ols_hrd_params_minus1 + 1 != NumMultiLayerOlss )
      for( i = 0; i < NumMultiLayerOlss; i++ )
        vps_ols_hrd_idx[ i ]
  }
  ...
}
``` | ue(v) |

For example, the above-described Table 1 may indicate a Video Parameter Set (VPS) including syntax elements for the DPB parameters and/or syntax elements for the HRD parameters that are being signaled.

Semantics for the syntax elements shown in the above-described Table 1 may be as follows.

TABLE 2

...
The variable NumLayersInOls[ i ], specifying the number of layers in the i-th OLS, the variable LayerIdInOls[ i ][ j ], specifying the nuh_layer_id value of the j-th layer in the i-th OLS, and the variable NumMultiLayerOlss, specifying the number of multi-layer OLSs (i.e., OLSs that contain more than one layer), are derived as follows:
    NumLayersInOls[ 0 ] = 1
    LayerIdInOls[ 0 ][ 0 ] = vps_layer_id[ 0 ]
    NumMultiLayerOlss = 0
    for( i = 1; i < TotalNumOlss; i++ ) {
      if( vps_each_layer_is_an_ols_flag ) {
        NumLayersInOls[ i ] = 1
        LayerIdInOls[ i ][ 0 ] = vps_layer_id[ i ]                                  (41)
      } else if( vps_ols_mode_idc = = 0 || vps_ols_mode_idc = = 1 ) {
        NumLayersInOls[ i ] = i + 1
        for( j = 0; j < NumLayersInOls[ i ]; j++ )
          LayerIdInOls[ i ][ j ] = vps_layer_id[ j ]
      } else if( vps_ols_mode_idc = = 2 ) {
        for( k = 0, j = 0; k <= vps_max_layers_minus1; k++ )
          if( layerIncludedInOlsFlag[ i ][ k ] )
            LayerIdInOls[ i ][ j++ ] = vps_layer_id[ k ]
        NumLayersInOls[ i ] = j
      }
      if( NumLayersInOls[ i ] > 1 )
        NumMultiLayerOlss++
    }
NOTE 1 - The 0-th OLS contains only the lowest layer (i.e., the layer with nuh_layer_id equal to vps_layer_id[ 0 ]) and for the 0-th OLS the only included layer is output.
...

TABLE 3 vps_num_dpb_params_minus1 plus 1, when present, specifies the number of dpb_parameters( ) syntax strutcures in the VPS. The value of vps_num_dpb_params_minus1 shall be in the range of 0 to NumMultiLayerOlss − 1, inclusive.
    The variable VpsNumDpbParams, specifying the number of dpb_parameters( ) syntax strutcures in the VPS, is derived as follows:
        if( vps_each_layer_is_an_ols_flag )
          VpsNumDpbParams = 0                                        (43)
        else
          VpsNumDpbParams = vps_num_dpb_params_minus1 + 1
    vps_sublayer_dpb_params_present_flag is used to control the presence of max_dec_pic_buffering_minus1[ ], max_num_reorder_pics[ ], and max_latency_increase_plus1[ ] syntax elements in the dpb_parameters( ) syntax strucures in the VPS. When not present, vps_sub_dpb_params_info_present_flag is inferred to be equal to 0.
    vps_dpb_max_temporal_id[ i ] specifies the TemporalId of the highest sublayer representation for which the DPB parameters may be present in the i-th dpb_parameters( ) syntax strutcure in the VPS. The value of vps_dpb_max_temporal_id[ i ] shall be in the range of 0 to vps_max_sublayers_minus1, inclusive. When not present, the value of vps_dpb_max_temporal_id[ i ] is inferred to be equal to vps_max_sublayers_minus1.
    vps_ols_dpb_pic_width[ i ] specifies the width, in units of luma samples, of each picture storage buffer for the i-th OLS.
    vps_ols_dpb_pic_height[ i ] specifies the height, in units of luma samples, of each picture storage buffer for the i-th OLS.
    vps_ols_dpb_chroma_format[ i ] specifies the greatest allowed value of sps_chroma_format_idc for all SPSs that are referred to by CLVSs in the CVS for the i-th OLS.

TABLE 3-continued vps_ols_dpb_bitdepth_minus8[ i ] specifies the greatest allowed value of sps_bit_depth_minus8 for all SPSs that are referred to by CLVSs in the CVS for the i-th OLS.
    NOTE 2 - For decoding an OLS containing more than one layer and having OLS index i, the deoder can safely allocate memory for the DPB according to the values of the sntax elements vps_ols_dpb_pic_width[ i ], vps_ols_dpb_pic_height[ i ], vps_ols_dpb_chroma_format[ i ], and vps_ols_dpb_bitdepth_minus8[ i ].
vps_ols_dpb_params_idx[ i ] specifies the index, to the list of dpb_parameters( ) syntax structures in the VPS, of the dpb_parameters( ) syntax structure that applies to the i-th multi-layer OLS. When present, the value of vps_ols_dpb_params_idx[ i ] shall be in the range of 0 to VpsNumDpbParams − 1, inclusive.
When vps_ols_dpb_params_idx[ i ] is not present, it is inferred as follows:
    If VpsNumDpbParams is equal to 1, the value of vps_ols_dpb_params_idx[ i ] to be equal to 0.
    Otherwise (VpsNumDpbParams is greater than 1 and equal to NumMultiLayerOlss), the value of vps_ols_dpb_params_idx[ i ] is inferred to be equal to i.
For a single-layer OLS, the applicable dpb_parameters( ) syntax structure is present in the SPS referred to by the layer in the OLS.
Each dpb_parameters( ) syntax structure in the VPS shall be referred to by at least one value of vps_ols_dpb_params_idx[ i ] for i in the range of 0 to NumMultiLayerOlss − 1, inclusive.
vps_general_hrd_params_present_flag equal to 1 specifies that the VPS contains a general_hrd_parameters( ) syntax structure and other HRD parameters.
vps_general_hrd_params_present_flag equal to 0 specifies that the VPS does not contain a general_hrd_parameters( ) syntax structure or other HRD parameters. When not present, the value of vps_general_hrd_params_present_flag is inferred to be equal to 0.
When NumLayersInOls[ i ] is equal to 1, the general_hrd_parameters( ) syntax structure and the ols_hrd_parameters( ) syntax structure that apply to the i-th OLS are present in the SPS referred to by the layer in the i-th OLS.
vps_sublayer_cpb_params_present_flag equal to 1 specifies that the i-th ols_hrd_parameters( ) syntax structure in the VPS contains HRD parameters for the sublayer representations with TemporalId in the range of 0 to vps_hrd_max_tid[ i ], inclusive.
vps_sublayer_cpb_params_present_flag equal to 0 specifies that the i-th ols_hrd_parameters( ) syntax structure in the VPS contains HRD parameters for the sublayer representation with TemporalId equal to vps_hrd_max_tid[ i ] only. When vps_max_sublayers_minus1 is equal to 0, the value of vps_sublayer_cpb_params_present_flag is inferred to be equal to 0.
When vps_sublayer_cpb_params_present_flag is equal to 0, the HRD parameters for the sublayer representations with TemporalId in the range of 0 to vps_hrd_max_tid[ i ] − 1, inclusive, are inferred to be the same as that for the sublayer representation with TemporalId equal to vps_hrd_max_tid[ i ]. These include the HRD parameters starting from the fixed_pic_rate_general_flag[ i ] syntax element till the sublayer_hrd_parameters( i ) syntax structure immediately under the condition "if( general_vcl_hrd_params_present_flag )" in the ols_hrd_parameters syntax structure.
vps_num_ols_hrd_params_minus1 plus 1 specifies the number of ols_hrd_parameters( ) syntax structures present in the VPS when vps_general_hrd_params_present_flag is equal to 1. The value of vps_num_ols_hrd_params_minus1 shall be in the range of 0 to NumMultiLayerOlss − 1, inclusive.
vps_hrd_max_tid[ i ] specifies the TemporalId of the highest sublayer representation for which the HRD parameters are contained in the i-th ols_hrd_parameters( ) syntax structure. The value of vps_hrd_max_tid[ i ] shall be in the range of 0 to vps_max_sublayers_minus1, inclusive. When not present, the value of vps_hrd_max_tid[ i ] is inferred to be equal to vps_max_sublayers_minus1.
vps_ols_hrd_idx[ i ] specifies the index, to the list of ols_hrd_parameters( ) syntax structures in the VPS, of the ols_hrd_parameters( ) syntax structure that applies to the i-th multi-layer OLS. The value of vps_ols_hrd_idx[ i ] shall be in the range of 0 to vps_num_ols_hrd_params_minus1, inclusive.
When NumLayersInOls[ i ] is greater than 1 and vps_ols_hrd_idx[ i ] is not present, it is inferred as follows:
    If vps_num_ols_hrd_params_minus1 is equal to 0, the value of vps_ols_hrd_idx[[ i ] is inferred to be equal to 0.
    Otherwise (vps_num_ols_hrd_params_minus1 is greater than 0 and vps_num_ols_hrd_params_minus1 + 1 is equal to NumMultiLayerOlss), the value of vps_ols_hrd_idx[ i ] is inferred to be equal to i.
For a single-layer OLS, the applicable ols_hrd_parameters( ) syntax structure is present in the SPS referred to by the layer in the OLS.
Each ols_hrd_parameters( ) syntax structure in the VPS shall be referred to by at least one value of vps_ols_hrd_idx[ i ] for i in the range of 1 to NumMultiLayerOlss − 1, inclusive.
. . .

For example, variable NumLayersInOls[i] designating a number of layers in an i-th OLS, variable LayerIdInOls[i][j] designating a nuh_layer_id value of a j-th layer in the i-th OLS, and variable NumMultiLayerOlss designating a number of multi-layer OLSs (i.e., an OLS including two or more layers) may be derived as shown in the above-described Table 2.

Additionally, for example, referring to Table 3, when syntax element vps_num_dpb_params_minus1 is present, the syntax element vps_num_dpb_params_minus1 may indicate a number of dpb_parameters( ) syntax structures of a VPS. The vps_num_dpb_params_minus1 value may be in a range from 0 to NumMultiLayerOlss−1.

For example, when a vps_each_layer_is_an_ols_flag value is equal to 1, variable VpsNumDpbParams indicating a number of dpb_parameters( ) syntax structures of a VPS may be inferred to be equal to 0, and, when the vps_each_layer_is_an_ols_flag value is not equal to 0, the variable VpsNumDpbParams may be inferred to be equal to vps_num_dpb_params_minus1+1.

Additionally, for example, syntax element vps_sublayer_dpb_params_present_flag may be used for controlling the presence of syntax elements max_dec_pic_buffering_minus1[ ], max_num_reorder_pics[ ], and max_latency_increase_plus1[ ] in a dpb_parameters( ) syntax structure within a VPS. Additionally, if the syntax element vps_sublayer_dpb_params_present_flag is not present, the value of the syntax element vps_sublayer_dpb_params_present_flag may be inferred to be equal to 0.

Additionally, for example, syntax element vps_dpb_max_temporal_id [i] may indicate a TemporalId of a highest sublayer representation wherein DPB parameters may be present in an i-th dpb_parameters( ) syntax structure within a VPS. The vps_dpb_max_temporal_id [i] value should be within a range of 0 to vps_max_sublayers_minus1. When not present, the vps_dpb_max_temporal_id [i] value is inferred to be equal to vps_max_sublayers_minus1.

Additionally, for example, syntax element vps_ols_dpb_pic_width [i] may indicate a width of each picture storage buffer for an i-th multi-layer OLS, in luma sample units.

Additionally, for example, syntax element vps_ols_dpb_pic_height [i] may indicate a height of each picture storage buffer for an i-th multi-layer OLS, in luma sample units.

Additionally, for example, syntax element vps_ols_dpb_chroma_format [i] may indicate a maximum allowable value of sps_chroma_format_idc for all SPSs that are referred to by a CLVS within a CVS for the i-th multi-layer OLS.

Additionally, for example, syntax element vps_ols_dpb_bitdepth_minus8 [i] may indicate a maximum allowable value of sps_bit_depth_minus8 for all SPSs that are referred to by a CLVS within a CVS for the i-th multi-layer OLS.

Additionally, for example, syntax element vps_ols_dpb_params_idx[i] may indicate an index of a dpb_parameters( ) syntax structure that is applied to the i-th OLS. The index may be an index of a dpb_parameters( ) syntax structure of the VPS. That is, the syntax element vps_ols_dpb_params_idx[i] may indicate an index of a dpb_parameters( ) syntax structure that is applied to the i-th OLS, among the plurality of dpb_parameters( ) syntax structures of the VPS. The vps_ols_dpb_params_idx[i] value may be within a range of 0 to VpsNumDpbParams-1.

Herein, when the syntax element vps_ols_dpb_params_idx[i] is not present, the value of the syntax element vps_ols_dpb_params_idx[i] may be inferred as follows. For example, if VpsNumDpbParams is equal to 1, the vps_ols_dpb_params_idx[i] value may be inferred to be equal to 0, and, otherwise (i.e., when VpsNumDpbParams is greater than 1 and equal to NumMultiLayerOlss), the vps_ols_dpb_params_idx[i] value may be inferred to be equal to i.

Additionally, for example, for a single layer OLS, an applicable dpb_parameters( ) syntax structure may be present in an SPS that is referred to by a layer of the OLS. Each dpb_parameters( ) syntax structure of the VPS may be referred to by at least one vps_ols_dpb_params_idx [i] value for i of a range from 0 to NumMultiLayerOlss-1 inclusive.

Additionally, for example, syntax element vps_general_hrd_params_present_flag may indicate whether or not the VPS includes a general_hrd_parameters( ) syntax structure and other HRD parameters. For example, if the vps_general_hrd_params_present_flag value is equal to 1, this may indicate that the VPS includes a general_hrd_parameters( ) syntax structure and other HRD parameters. And, if the vps_general_hrd_params_present_flag value is equal to 0, this may indicate that the VPS does not include a general_hrd_parameters( ) syntax structure nor other HRD parameters. When the syntax element vps_general_hrd_params_present_flag is not present, the value of the syntax element vps_general_hrd_params_present_flag may be inferred to be equal to 0.

When a value of NumLayersInOls [i] is equal to 1, a general_hrd_parameters( ) syntax structure and an ols_hrd_parameters( ) syntax structure that are applied to an i-th OLS may be present in an SPS that is referred to by a layer of the i-th OLS.

Additionally, for example, syntax element vps_sublayer_cpb_params_present_flag may indicate whether or not HRD parameters for sublayer representations having a TemporalId range from 0 to hrd_max_tid[i] (inclusive) in an i-th ols_hrd_parameters( ) syntax structure of a VPS. For example, if a vps_sublayer_cpb_params_present_flag value is equal to 1, this may indicate that HRD parameters for sublayer representations having a TemporalId range from 0 to vps_hrd_max_tid [i] (inclusive) are included in an i-th ols_hrd_parameters( ) syntax structure of a VPS. And, if the vps_sublayer_cpb_params_present_flag value is equal to 0, this may indicate that only HRD parameters for sublayer representations having a TemporalId that is equal to vps_hrd_max_tid [i] are included in an i-th ols_hrd_parameters( ) syntax structure of a VPS. When vps_max_sublayers_minus1 is equal to 0, the vps_sublayer_cpb_params_present_flag value may be inferred to be equal to 0.

When the vps_sublayer_cpb_params_present_flag value is equal to 0, an HRD parameter for a sublayer representation having a TemporalId of a range from 0 to hrd_max_tid [i] (inclusive) may be inferred to be equal to a sublayer representation having a TemporalId that is equal to hrd_max_tid[i]. This includes HRD parameters starting from a fixed_pic_rate_general_flag [i] syntax element to a sublayer_hrd_parameters (i) syntax structure, which is immediately below an "if (general_vcl_hrd_params_present_flag)" condition of an ols_hrd_parameters syntax structure.

Additionally, for example, vps_num_ols_hrd_params_minus1+1 indicates a number of ols_hrd_parameters( ) syntax structures that are present in a VPS, when a vps_general_hrd_params_present_flag value is equal to 1. A num_ols_hrd_params_minus1 value should be within a range from 0 to TotalNumOlss-1.

Additionally, for example, the syntax element hrd_max_tid[i] may indicate a TemporalId of a highest sublayer representation having HRD parameters that are included in an i-th ols_hrd_parameters( ) syntax structure. The value of hrd_max_tid[i] may be within a range of 0 to vps_max_sublayers_minus1. When vps_max_sublayers_minus1 is equal to 0, the hrd_max_tid[i] value may be inferred to be equal to 0. When the syntax element hrd_max_tid[i] is not present, the hrd_max_tid[i] value may be inferred to be equal to vps_max_sublayers_minus1.

Additionally, for example, the syntax element vps_ols_hrd_idx [i] may indicate an index of an ols_hrd_parameters( ) syntax structure that is applied to an i-th multi-layer OLS. The index may be an index of an ols_hrd_parameters( ) syntax structure list of the VPS. That is, the syntax element ols_hrd_idx[i] may indicate an index of an ols_hrd_parameters( ) syntax structure that is applied to an i-th multi-layer OLS, among a plurality of ols_hrd_parameters( ) syntax structures of the VPS. Herein, the ols_hrd_idx[i] value should be within a range of 0 to vps_num_ols_hrd_params_minus1.

If NumLayersInOls[i] is greater than 1, and if vps_ols_hrd_idx[i] is not present, the following may be inferred. For example, if vps_num_ols_hrd_params_minus1 is equal to 0, the vps_ols_hrd_idx[i] value may be inferred to be equal to 0, and, otherwise (i.e., when vps_num_ols_hrd_params_minus1 is greater than 0, and when vps_num_ ols_hrd_params_minus1+1 is equal to NumMultiLayerOlss), the vps_ols_hrd_idx[i] value may be inferred to be equal to i.

Meanwhile, in case of a single layer OLS (i.e., when NumLayersInOls[i] is equal to 1), an ols_hrd_parameters( ) syntax structure being applied to an i-th OLS may be present in an SPS that is referred to by a layer within the i-th OLS.

Each ols_hrd_parameters( ) syntax structure of a VPS may be referred to by at least one vps_ols_hrd_idx[i] value for i of a range from 1 to NumMultiLayerOlss-1.

The DPB related information and/or HRD related information may be signaled as described above. Meanwhile, the signaling method of vps_ols_dpb_pic_width[i], vps_ols_dpb_pic_height[i], vps_ols_dpb_chroma_format[i], vps_ols_dpb_bitdepth_minus8[i], vps_ols_dpb_params_idx[i], vps_ols_dpb_params_idx[i] according to the conventional (or existing) video/image standard may have the following problems.

More specifically, the above-described syntax elements may be signaled only for OLSs having multi-layers. However, when the above-described syntax elements are referred to during a decoding process, an index of a target OLS index (i.e., an index of a decoded OLS) may refer to all of the OLS list. That is, an index of a target OLS of the above-described syntax elements may refer to all OLSs including OLSs having a single layer and OLSs having multi-layers.

In case the target OLS is an OLS having multi-layers, the above-described mismatch (or inconsistency) of the target OLS index may cause the decoding apparatus to indicate (or designate) the wrong DPB information and HRD information set. In other words, although the above-described syntax elements are signaled only for the OLSs including multi-layers, as the target OLS index of the above-described syntax elements is configured as indexes of all OLSs including OLSs having single layers, the decoding apparatus may indicate the wrong DPB related information and HRD related information as the OLS information instead of the DPB related information and HRD related information for the target OLS.

Accordingly, the present disclosure proposes a solution for resolving the above-described problem (or issue). The proposes embodiments may be applied individually or in combination.

As an example, mapping of a list of all OLSs being signaled in the VPS and a list of OLSs having a number of layers that is greater than 1 may be defined. That is, for example, mapping between a list of all OLSs being signaled in the VPS and a list of OLSs having a number of layers that is greater than 1 may be defined. An OLS having the number of layers that is greater than 1 may be referred to as a multi-layer OLS.

More specifically, for example, a) the mapping should be capable of transforming the indexes of the list of all OLSs to a same OLS index in the list of OLSs having multi-layers. In other words, the mapping should be capable of transforming an index of a target OLS in the list of all OLSs to the index of the target OLS in the list of OLSs having multi-layers.

For example, b) an array that maps both of the above-described lists may be referred to as MultiLayeredOlsIdx[i] for i ranges for values subtracting 1 from 0 to the number of OLSs. The value of MultiLayeredOlsIdx[i] may indicate a correlation between an i-th OLS (i.e., all OLSs) and a j-th multi-layer OLS having a j value that is equal to MultiLayeredOlsIdx[i].

As an example, the above-described array MultiLayeredOlsIdx[i] may be used for obtaining the corresponding values of vps_ols_dpb_pic_width[j], vps_ols_dpb_pic_height[j], vps_ols_dpb_chroma_format[j], vps_ols_dpb_bitdepth_minus8[j], vps_ols_dpb_params_idx[j], and vps_ols_hrd_idx[j] for a given OLS index TargetOlsIdx.

For example, the steps that will hereinafter be described in detail may be applied to the embodiments of the present disclosure. That is, the following steps may be used for providing exemplary description of the embodiments.

For example, an encoding apparatus may derive information related to an OLS. For example, the encoding apparatus may derive an HRD parameter and/or a DPB parameter. OLS related information may include HRD parameter related information (i.e., OLS HRD information) and/or DPB parameter related information (i.e., OLS DPB information). The encoding apparatus may encode a picture (or pictures) based on the OLS related information. The encoding apparatus may encode a picture (or pictures) based on at least one of the HRD parameter and/or the DPB parameter. Thereafter, the encoding apparatus may encode video/image information including the OLS related information and may, then, output a bitstream. For example, the encoding apparatus may encode video/image information including HRD parameter related information and/or DPB parameter related information. Herein, the bitstream may be a multi-layer bitstream. That is, the bitstream may include at least one sub-bitstream. An encoding process for the OLS related information (or HRD parameter related information and/or DPB parameter related information) may be performed based on the embodiment(s) of the present disclosure.

Additionally, for example, the decoding apparatus may derive video/image information from a bitstream. The bitstream may include at least one sub-bitstream. The sub-bitstream may be related to a layer or OLS. For example, a sub-bitstream extraction process may be a designated process during which a NAL unit of a bitstream that does not belong to a target set, which is determined by a target OLS index and a target highest TemporalId, is removed together with an output sub-bitstream that is configured of a NAL unit of a bitstream that belongs to the target set. Video/image information may include OLS related information. Additionally, for example, OLS related information may include HRD parameter related information and/or DPB parameter related information. The decoding apparatus may decode/output a picture (or pictures) based on the OLS related information. For example, the decoding apparatus may decode/output a picture (or pictures) based on at least one of the HRD parameter related information and/or the DPB parameter related information. That is, for example, the decoding apparatus may decode or output a picture (or pictures) based on an OLS/DPB/HRD.

The above-described embodiments may be implemented as follows. For example, the above-described embodiments may be denoted according to a VVC standard specification, as described below.

TABLE 4

...

The variable NumLayersInOls[ i ], specifying the number of layers in the i-th OLS, the variable
LayerIdInOls[ i ][ j ], specifying the nuh_layer_id value of the j-th layer in the i-th OLS, the variable TABLE 4-continued NumMultiLayerOlss, specifying the number of multi-layer OLSs (i.e., OLSs that contain more than one layer), and the variable MultiLayeredOlsIdx[ i ], specifying the index of the i-th OLS among the OLS with number of layers greater than 1, are derived as follows:
```
    NumLayersInOls[ 0 ] = 1
    LayerIdInOls[ 0 ][ 0 ] = vps_layer_id[ 0 ]
    NumMultiLayerOlss = 0
    for( i = 1; i < TotalNumOlss; i++ ) {
      if( vps_each_layer_is_an_ols_flag ) {
        NumLayersInOls[ i ] = 1
        LayerIdInOls[ i ][ 0 ] = vps_layer_id[ i ]                        (41)
      } else if( vps_ols_mode_idc = = 0 || vps_ols_mode_idc = = 1 ) {
        NumLayersInOls[ i ] = i + 1
        for( j = 0; j < NumLayersInOls[ i ]; j++ )
          LayerIdInOls[ i ][ j ] = vps_layer_id[ j ]
      } else if( vps_ols_mode_idc = = 2 ) {
        for( k = 0, j = 0; k <= vps_max_layers_minus1; k++ )
          if( layerIncludedInOlsFlag[ i ][ k ] )
            LayerIdInOls[ i ][ j++ ] = vps_layer_id[ k ]
        NumLayersInOls[ i ] = j
      }
      if( NumLayersInOls[ i ] > 1 ) {
        MultiLayeredOlsIdx[ i ] = NumMultiLayerOlss
        NumMultiLayerOlss++
      }
      else
        MultiLayeredOlsIdx[ i ] = −1
    }
```
NOTE 1 - The 0-th OLS contains only the lowest layer (i.e., the layer with nuh_layer_id equal to vps_layer_id[ 0 ]) and for the 0-th OLS the only included layer is output.
. . .

TABLE 5

. . .
A.1.1 General tier and level limits
For purposes of comparison of tier capabilities, the tier
with general_tier_flag equal to 0 is considered
to be a lower tier than the tier with general_tier_flag
equal to 1.
For purposes of comparison of level capabilities, a particular
level of a specific tier is considered to be
a lower level than some other level of the same tier
when the value of the general_level_idc or
sublayer_level_idc[ i ] of the particular level
is less than that of the other level.
The following is specified for expressing the
constraints in this annex:
    Let AU n be the n-th AU in decoding order, with
    the first AU being AU 0 (i.e., the 0-th AU).
    For an OLS with OLS index TargetOlsIdx,
    the variables PicWidthMaxInSamplesY,
    PicHeightMaxInSamplesY, and PicSizeMaxInSamplesY,
    and the applicable dpb_parameters( )
    syntax structure are derived as follows:
        If NumLayersInOls[ TargetOlsIdx ] is
        equal to 1, PicWidthMaxInSamplesY is set
        equal to sps_pic_width_max_in_luma_samples,
        PicHeightMaxInSamplesY is set equal
        to sps_pic_height_max_in_luma_samples,
        PicSizeMaxInSamplesY is set equal to
        PicWidthMaxInSamplesY * PicHeightMaxInSamplesY, where
        sps_pic_width_max_in_luma_samples and
        sps_pic_height_max_in_luma_samples are
        found in the SPS referred to by the layer
        in the OLS, and the applicable
        dpb_parameters( ) syntax structure is also
        found in that SPS.
        Otherwise (NumLayersInOls[ TargetOlsIdx ]
        is greater than 1),
        PicWidthMaxInSamplesY is set equal to
        vps_ols_dpb_pic_width[ MultiLayeredOlsIdx[
        TargetOlsIdx ] ],
        PicHeightMaxInSamplesY is set equal to
        vps_ols_dpb_pic_height[ MultiLayeredOlsIdx[
        TargetOlsIdx ] ],

TABLE 5-continued

PicSizeMaxInSamplesY is set equal to PicWidthMaxInSamplesY * PicHeightMaxInSamplesY, and the applicable dpb_parameters( ) syntax structure is identified by vps_ols_dpb_params_idx[ MultiLayeredOlsIdx[ TargetOlsIdx ] ] found in the VPS.

. . .

The syntax elements of non-VCL NAL units (or their default values for some of the syntax elements), required for the HRD, are specified in the semantic clauses of clause 7 and Annex D. When the VUI parameters or any SEI message specified in ITU-T H.SEI | ISO/IEC 23002-7 is included in a non-VCL NAL unit specified in this Specification, those syntax elements are specified in the semantics clauses of ITU-T H.SEI | ISO/IEC 23002-7.

Two sets of HRD parameters (NAL HRD parameters and VCL HRD parameters) are used. The HRD parameters are signalled through the general_hrd_parameters( ) syntax structure and the ols_hrd_parameters( ) syntax structure, which are either part of the VPS or part of the SPS.

A set of bitstream conformance tests is needed for checking the conformance of a bitstream, which is referred to as the entire bitstream, denoted as entireBitstream. The set of bitstream conformance tests are for testing the conformance of each OP of each OLS specified by the VPS, and also for testing the conformance of each subpicture sequence specified by the subpicture level information SEI message.

For each test, the following ordered steps apply in the order listed, followed by the processes described after these steps in this clause:

1. An operation point under test, denoted as targetOp, is selected by selecting a target OLS with OLS index opOlsIdx, a highest TemporalId value opTid, and optionally, a list of target subpicture index values opSubpicIdxList[ ], one for each layer. The value of opOlsIdx is in the range of 0 to TotalNumOlss − 1, inclusive. The value of opTid is in the range of 0 to vps_max_sublayers_minus1, inclusive.

If opSubpicIdxList[ ] is not present, targetOp consists of pictures, and each pair of selected values of opOlsIdx and opTid shall be such that the sub-bitstream that is the output by invoking the sub-bitstream extraction process as specified in clause C.6 with entireBitstream, opOlsIdx, and opTid as inputs satisify the following condition:
    - There is at least one VCL NAL unit with TemporalId equal to opTid in BitstreamToDecode.

Otherwise (opSubpicIdxList[ ] is present), targetOp consists of subpictures, and the sub-bitstream that is the output by invoking the subpicture sub-bitstream extraction process as specified in clause C.7 with entireBitstream, opOlsIdx, opTid, and opSubpicIdxList[ ] as inputs satisify the following conditions:
    - There is at least one VCL NAL unit with TemporalId equal to opTid in BitstreamToDecode.
    - There is at least one VCL NAL unit with nuh_layer_id equal to LayerIdInOls[ opOlsIdx ][ j ] and with sh_subpic_id equal to SubpicIdVal[ opSubpicIdxList[ j ] ] for each j in the range of 0 to NumLayersInOls[ targetOlsIdx ] − 1.
      NOTE 2 - Regardless of whether opSubpicIdxList[ ] is present, due to that each IRAP or GDR AU needs to be complete, there is at least one VCL NAL unit with nuh_layer_id equal to each of the nuh_layer_id values in LayerIdInOls[ opOlsIdx ] in BitstreamToDecode.

1. If opSubpicIdxList[ ] is not present the following applies:
    - If the layers in targetOp include all layers in entireBitstream and opTid is equal to the highest TemporalId value among all NAL units in entireBitstream, BitstreamToDecode is set to be identical to entireBitstream.
    - Otherwise, BitstreamToDecode is set to be the output by invoking the sub-bitstream extraction process as specified in clause C.6 with entireBitstream, opOlsIdx, and opTid as inputs.

Otherwise (opSubpicIdxList[ ] is present), BitstreamToDecode is set to be the output by invoking the subpicture sub-bitstream extraction process as specified in clause C.7 with entireBitstream, opOlsIdx, opTid and opSubpicIdxList[ ] as inputs.

1. The values of TargetOlsIdx and Htid are set equal to opOlsIdx and opTid, respectively, of targetOp.

2. The general_hrd_parameters( ) syntax structure, the ols_hrd_parameters( ) syntax structure, and the sublayer_hrd_parameters( ) syntax structure applicable to BitstreamToDecode are selected as follows:
    - If NumLayersInOls[ TargetOlsIdx ] is equal to 1, the general_hrd_parameters( ) syntax structure and the ols_hrd_parameters( ) syntax structure in the SPS referenced by the layer in BitstreamToDecode (or provided through an external means not specified in this Specification) are selected. Otherwise, the general_hrd_parameters( ) syntax structure and the vps_ols_hrd_idx[

TABLE 5-continued

|   | MultiLayeredOlsIdx[ TargetOlsIdx ] ]-th ols_hrd_parameters( ) syntax structure in the VPS (or provided through an external means not specified in this Specification) are selected. |
|---|---|
|   | - Within the selected ols_hrd_parameters( ) syntax structure, for testing of the Type I bitstream conformance piont, the sublayer_hrd_parameters( Htid ) syntax structure that immediately follows the condition "if( general_vcl_hrd_params_present_flag )" is selected and the variable NalHrdModeFlag is set equal to 0, and for testing of the Type II bitstream conformance piont, the sublayer_hrd_parameters( Htid ) syntax structure that immediately follows the condition "if( general_nal_hrd_params_present_flag )" is selected and the variable NalHrdModeFlag is set equal to 1. When BitstreamToDecode is a Type II bitstream and NalHrdModeFlag is equal to 0, all non-VCL NAL units except filler data NAL units, and all leading_zero_8bits, zero_byte, start_code_prefix_one_3bytes and trailing_zero_8bits syntax elements that form a byte stream from the NAL unit stream (as specified in Annex B), when present, are discarded from BitstreamToDecode and the remaining bitstream is assigned to BitstreamToDecode. |
| 1. | An AU associated with a BP SEI message (present in BitstreamToDecode or available through external means not specified in this Specification) applicable to TargetOp is selected as the HRD initialization point and referred to as AU 0. |
| 2. | When general_decoding_unit_hrd_params_present_flag in the selected general_hrd_parameters( ) syntax structure is equal to 1, the CPB is scheduled to operate either at the AU level (in which case the variable DecodingUnitHrdFlag is set equal to 0) or at the DU level (in which case the variable DecodingUnitHrdFlag is set equal to 1). Otherwise, DecodingUnitHrdFlag is set equal to 0 and the CPB is scheduled to operate at the AU level. |
| 3. | For each AU in BitstreamToDecode starting from AU 0, the BP SEI message (present in BitstreamToDecode or available through external means not specified in this Specification) that is associated with the AU and applies to TargetOlsIdx is selected, and the PT SEI message (present in BitstreamToDecode or available through external means not specified in this Specification) that is associated with the AU and applies to TargetOlsIdx is selected, and when DecodingUnitHrdFlag is equal to 1 and du_cpb_params_in_pic_timing_sei_flag is equal to 0, the DU information SEI messages (present in BitstreamToDecode or available through external means not specified in this Specification) that are associated with DUs in the AU and apply to TargetOlsIdx are selected. |
| 4. | A value of ScIdx is selected. The selected ScIdx shall be in the range of 0 to hrd_cpb_cnt_minus1, inclusive. |
| 5. | When the BP SEI message associated with AU 0 has cpb_alt_timing_info_present_flag equal to 1, either of the following applies for selection of the initial CPB removal delay and delay offset: |
|   | - If NalHrdModeFlag is equal to 1, the default initial CPB removal delay and delay offset represented by nal_initial_cpb_removal_delay[ Htid ][ ScIdx ] and nal_initial_cpb_removal_offset[ Htid ][ ScIdx ], respectively, in the selected BP SEI message are selected. Otherwise, the default initial CPB removal delay and delay offset represented by vcl_initial_cpb_removal_delay[ Htid ][ ScIdx ] and vcl_initial_cpb_removal_offset[ Htid ][ ScIdx ], respectively, in the selected BP SEI message are selected. The variable DefaultInitCpbParamsFlag is set equal to 1. |
|   | - If NalHrdModeFlag is equal to 1, the alternative initial CPB removal delay and delay offset represented by nal_initial_cpb_removal_delay[ Htid ][ ScIdx ] and nal_initial_cpb_removal_offset[ Htid ][ ScIdx ], respectively, in the selected BP SEI message and nal_cpb_alt_initial_removal_delay_delta[ Htid ][ ScIdx ] and nal_cpb_alt_initial_removal_offset_delta[ Htid ][ ScIdx ], respectively, in the PT SEI message associated with the AU following AU 0 in decoding order are selected. |

TABLE 5-continued

Otherwise, the alternative initial CPB removal delay
and delay offset represented by
vcl_initial_cpb_removal_delay[ Htid ][ ScIdx ] and
vcl_initial_cpb_removal_offset[ Htid ][
ScIdx ], respectively, in the selected BP SEI
message and vcl_cpb_alt_initial_removal_delay_delta[
Htid ][ ScIdx ] and
vcl_cpb_alt_initial_removal_offset_delta[
Htid ][ ScIdx ], respectively, in the PT SEI
message associated with the AU following AU 0 in
decoding order are selected. The
variable DefaultInitCpbParamsFlag is set equal
to 0, and one of the following applies:
-         The RASL AUs that contain RASL
        pictures with
        pps_mixed_nalu_types_in_pic_flag
        equal to 0 and are associated with CRA
        pictures contained in AU 0 are
        discarded from BitstreamToDecode and the
        remaining bitstream is assigned
        to BitstreamToDecode.
-         All AUs following AU 0 in decoding
        order up to an AU associated with a DRAP
        indication SEI message are discarded
        from BitstreamToDecode and the remaining
        bitstream is assigned to BitstreamToDecode.

. . .

For each bitstream conformance test, the CPB size (number of bits) is CpbSize[ Htid ][ ScIdx ] as
specified in clause 7.4.6.3, where ScIdx and the HRD parameters are specified above in this clause,
and the DPB parameters max_dec_pic_buffering_minus1[ Htid ], max_num_reorder_pics[ Htid ], and
MaxLatencyPictures[ Htid ] are found in or derived from the dpb_parameters( ) syntax structure that
applies to the target OLS as follows:
    If NumLayersInOls[ TargetOlsIdx ] is equal to 1, the dpb_parameters( ) syntax structure is found
    in the SPS referred to be the layer in the target OLS, and the variables
    PicWidthMaxInSamplesY, PicHeightMaxInSamplesY, MaxChromaFormat, and
    MaxBitDepthMinus8 are set equal to sps_pic_width_max_in_luma_samples,
    sps_pic_height_max_in_luma_samples, sps_chroma_format_idc, and sps_bit_depth_minus8,
    respectively, found in the SPS referred to by the layer in the target OLS.
    Otherwise (NumLayersInOls[ TargetOlsIdx ] is greater than 1), the dpb_parameters( ) is
    identified by vps_ols_dpb_params_idx[ MultiLayeredOlsIdx[ TargetOlsIdx ] ] found in the VPS,
    and the variables PicWidthMaxInSamplesY, PicHeightMaxInSamplesY, MaxChromaFormat,
    and MaxBitDepthMinus8 are set equal to
    vps_ols_dpb_pic_width[ MultiLayeredOlsIdx[ TargetOlsIdx ] ],
    vps_ols_dpb_pic_height[ MultiLayeredOlsIdx[ TargetOlsIdx ] ],
    vps_ols_dpb_chroma_format[ MultiLayeredOlsIdx[ TargetOlsIdx ] ], and
    vps_ols_dpb_bitdepth_minus8[ MultiLayeredOlsIdx[ TargetOlsIdx ] ], respectively, found in the
    VPS.

. . .

The output sub-bitstream outBitstream is derived as follows:
    The sub-bitstream extraction process, specified in Annex C.6, is invoked with inBitstream,
    targetOlsIdx, and tIdTarget as inputs and the output of the process is assigned to outBitstream.
    If some external means not specified in this Specification is available to provide replacement
    parameter sets for the sub-bitstream outBitstream, replace all parameter sets with the
    replacement parameter sets.
    Otherwise, when subpicture level information SEI messages are present in inBitstream, the
    following applies:
        The variable subpicIdx is set equal to the value of
        subpicIdxTarget[ [ NumLayersInOls[
        targetOlsIdx ] − 1 ] ].
        Rewrite the value of general_level_idc in
        the vps_ols_ptl_idx[ targetOlsIdx ]-th entry in the
        list of profile_tier_level( ) syntax structures
        in all the referenced VPS NAL units to be equal
        to SubpicSetLevelIdc derived in Equation D.10
        for the set of subpictures consisting of the
        subpictures with subpicture index equal to subpicIdx.
        When VCL HRD parameters or NAL HRD parameters
        are present, rewrite the respective
        values of cpb_size_value_minus1[
        tIdTarget ][ j ] and
        bit_rate_value_minus1[ tIdTarget ][
        j ] of the j-th CPB in the
        vps_ols_hrd_idx[ MultiLayeredOlsIdx[
        targetOlsIdx ] ]-th entry in the list of
        ols_hrd_parameters( ) syntax structures in all
        the referenced VPS NAL units and in the
        ols_hrd_parameters( ) syntax structures in all
        SPS NAL units referred to by the i-th layer,
        such that they correspond to SubpicCpbSizeVcl[
        SubpicSetLevelIdx ][ subpicIdx ], and

TABLE 5-continued

SubpicCpbSizeNal[ SubpicSetLevelIdx ][ subpicIdx ] as derived by Equations D.5 and D.6, respectively, SubpicBitrateVcl[ SubpicSetLevelIdx ][ subpicIdx ] and SubpicBitrateNal[ SubpicSetLevelIdx ][ subpicIdx ] as derived by Equations D.7 and D.8, respectively, where SubpicSetLevelIdx is derived by Equation D.10 for the subpicture with subpicture index equal to subpicIdx, j is in the range of 0 to hrd_cpb_cnt_minus1, inclusive, and i is in the range of 0 to NumLayersInOls[ targetOlsIdx ] − 1, inclusive. For the i-th layer with i in the range of 0 to NumLayersInOls[ targetOlsIdx ] − 1, the following applies.

Rewrite the value of general_level_idc in the profile_tier_level( ) syntax structure in all the referenced SPS NAL units with sps_ptl_dpb_hrd_params_present_flag equal to 1 to be equal to SubpicSetLevelIdc derived by Equation D.10 for the set of subpictures consisting of the subpicture with subpicture index equal to subpicIdx.

The variables subpicWidthInLumaSamples and subpicHeightInLumaSamples are derived as follows:

ubpicWidthInLumaSamples =
  min( ( sps_subpic_ctu_top_left_x[ subpicIdx ] +
  sps_subpic_width_minus1[ subpicIdx ] + 1 ) * CtbSizeY,
  pps_pic_width_in_luma_samples ) −
  sps_subpic_ctu_top_left_x[ subpicIdx ] * CtbSizeY     (C.24)

ubpicHeightInLumaSamples =
  min( ( sps_subpic_ctu_top_left_y[ subpicIdx ] +
  sps_subpic_height_minus1[ subpicIdx] + 1 ) * CtbSizeY,
  pps_pic_height_in_luma_samples ) −
  sps_subpic_ctu_top_left_y[ subpicIdx ] * CtbSizeY     (C.25)

Rewrite the values of the sps_pic_width_max_in_luma_samples and sps_pic_height_max_in_luma_samples in all the referenced SPS NAL units and the values of pps_pic_width_in_luma_samples and pps_pic_height_in_luma_samples in all the referenced PPS NAL units to be equal to subpicWidthInLumaSamples and subpicHeightInLumaSamples, respectively.

Rewrite the value of sps_num_subpics_minus1 in all the referenced SPS NAL units and pps_num_subpics_minus1 in all the referenced PPS NAL units to 0.

Rewrite the syntax elements sps_subpic_ctu_top_left_x[ subpicIdx ] and sps_subpic_ctu_top_left_y[ subpicIdx ], when present, in all the referenced SPS NAL units to 0.

Remove the syntax elements sps_subpic_ctu_top_left_x[ j ], sps_subpic_ctu_top_left_y[ j ], sps_subpic_width_minus1[ j ], sps_subpic_height_minus1[ j ], sps_subpic_treated_as_pic_flag[ j ], sps_loop_filter_across_subpic_enabled_flag[ j ], and sps_subpic_id[ j ] in all the referenced SPS NAL units and for each j that is not equal to subpicIdx.

Rewrite the syntax elements in all the referenced PPS for signalling of tiles and slices to remove all tile rows, tile columns, and slices that are not associated with the subpicture with subpicture index equal to subpicIdx.

TABLE 5-continued

```
        The variables subpicConfWinLeftOffset,
        subpicConfWinRightOffset,
        subpicConfWinTopOffset and subpicConfWinBottomOffset
        are derived as follows:
            subpicConfWinLeftOffset =
            sps_subpic_ctu_top_left_x[ subpicIdx ] = =
            0 ? (C.26)
                            sps_conf_win_left_offset : 0
            ubpicConfWinRightOffset =                    (C.27)
            ( sps_subpic_ctu_top_left_x[ subpicIdx ] +
                            sps_subpic_width_minus1[
                            subpicIdx ] + 1 ) *CtbSizeY >=
                            sps_pic_width_max_in_luma_samples ?
                            sps_conf_win_right_offset : 0
            subpicConfWinTopOffset =
            sps_subpic_ctu_top_left_y[ subpicIdx ] = =
            0 ? (C.28)
                            sps_conf_win_top_offset: 0
            subpicConfWinBottomOffset = (               (C.29)
            sps_subpic_ctu_top_left_y[ subpicIdx ] +
                            sps_subpic_height_minus1[
                            subpicIdx ] + 1 ) * CtbSizeY >=
                            sps_pic_height_max_in_luma_samples ?
                            sps_conf_win_bottom_offset: 0
        Rewrite the values of sps_conf_win_left_offset,
        sps_conf_win_right_offset,
        sps_conf_win_top_offset, and sps_conf_win_bottom_offset
        in all the referenced SPS
        NAL units and the values of pps_conf_win_left_offset,
        pps_conf_win_right_offset,
        pps_conf_win_top_offset, and pps_conf_win_bottom_offset
        in all the referenced PPS
        NAL units to be equal to subpicConfWinLeftOffset,
        subpicConfWinRightOffset,
        subpicConfWinTopOffset, and subpicConfWinBottomOffset,
        respectively.
        Remove from outBitstream all VCL NAL units with
        nuh_layer_id equal to the
        nuh_layer_id of the i-th layer and with sh_subpic_id
        not equal to
        SubpicIdVal[ subpicIdx ].
When sli_cbr_constraint_flag is equal to 1, remove all NAL
units with nal_unit_type equal
to FD_NUT and filler payload SEI messages that are not
associated with the VCL NAL
units of a subpicture in subpicIdTarget[ ] and set
cbr_flag[ tIdTarget ][ j ] equal to 1 of the
j-th CPB in the vps_ols_hrd_idx[ MultiLayeredOlsIdx[
targetOlsIdx ] ]-th entry in the list of
ols_hrd_parameters( ) syntax structures in all the referenced
VPS NAL units and SPS NAL
units and j in the range of 0 to hrd_cpb_cnt_minus1.
Otherwise, (sli_cbr_constraint_flag is
equal to 0), remove all NAL units with nal_unit_type equal
to FD_NUT and filler payload
SEI messages and set cbr_flag[ tIdTarget ][ j ] equal to 0.
When outBitstream contains SEI NAL units that contain a scalable nesting SEI message with
nesting_ols_flag equal to 1 and nesting_subpic_flag equal to 1 that are applicable to
outBitstream, extract appropriate non-scalable-nested SEI message with payloadType equal to 1
(picture timing), 130 (decoding unit information), or 132 (decoded picture hash) from the
scalable nesting SEI message and place the extracted SEI messages into outBitstream.
. . .
```

Table 4 may indicate a process of deriving a multi-layer OLS index (MultiLayeredOlsIdx[i]) of an i-th OLS.

For example, referring to Table 4, when an i-th OLS includes a number of layers that is greater than 1 (i.e., when NumLayersInOls[i]>1), MultiLayeredOlsIdx[i] may be inferred to be equal to NumMultiLayerOlss, and, then, the NumMultiLayerOlss value may be incremented by 1. That is, MultiLayeredOlsIdx[ ] for a multi-layer OLS of a later order following the i-th OLS may be inferred to be equal to a value that is greater than the MultiLayeredOlsIdx[i] for the i-th OLS by 1.

More specifically, for example, in case the target OLS is an n-th OLS among the multi-layer OLS s, a multi-layer OLS index of the target OLS may be derived as n−1. For example, when the target OLS, which is an i-th OLS among all OLSs, is an n-th OLS among the multi-layer OLSs, the multi-layer OLS index (MultiLayeredOlsIdx[i]) of the target OLS may be derived as n−1.

Additionally, for example, referring to Table 5, a DPB parameter and/or an HRD parameter for a target OLS may be derived by using MultiLayeredOlsIdx[TargetOlsIdx] for the target OLS.

For example, referring to Table 5, when the number of layers for a target OLS is greater than 1 (when NumLayersInOls[TargetOlsIdx] is greater than 1), i.e., when the target OLS is a multi-layer OLS, variable PicWidthMaxIn- SamplesY may be configured to be the same as vps_ols_dpb_pic_width[MultiLayeredOlsIdx[TargetOlsIdx]], variable PicHeightMaxInSamplesY may be configured to be the same as vps_ols_dpb_pic_height[MultiLayeredOlsIdx[TargetOlsIdx]], variable PicSizeMaxInSamplesY may be configured to be the same as PicWidthMaxInSamplesY*PicHeightMaxInSamplesY, and a dpb_parameters( ) syntax structure that is applicable to the target OLS may be identified as vps_ols_dpb_params_idx[MultiLayeredOlsIdx[TargetOlsIdx]] that is present in the VPS.

Additionally, for example, referring to Table 5, when the number of layers for a target OLS is not equal to 1 (when NumLayersInOls[TargetOlsIdx] is not equal to 1), i.e., when the target OLS is a multi-layer OLS, a general_hrd_parameters( ) syntax structure and a vps_ols_hrd_idx[MultiLayeredOlsIdx[TargetOlsIdx]]-th ols_hrd_parameters( ) syntax structure of the VPS may be selected as a general_hrd_parameters( ) syntax structure and an ols_hrd_parameters( ) syntax structure that are applicable to BitstreamToDecode.

Additionally, for example, referring to Table 5, when the number of layers for a target OLS is greater than 1 (when NumLayersInOls[TargetOlsIdx] is greater than 1), i.e., when the target OLS is a multi-layer OLS, i.e., when the target OLS is a multi-layer OLS, a dpb_parameters( ) syntax structure that is applied to the target OLS may be identified as vps_ols_dpb_params_idx[MultiLayeredOlsIdx[TargetOlsIdx]], which is present in the VPS, and each of the variables PicWidthMaxInSamplesY, PicHeightMaxInSamplesY, MaxChromaFormat, and MaxBitDepthMinus8 may be configured to be the same as vps_ols_dpb_pic_width[MultiLayeredOlsIdx[TargetOlsIdx]], vps_ols_dpb_pic_height[MultiLayeredOlsIdx[TargetOlsIdx]], vps_ols_dpb_chroma_format[MultiLayeredOlsIdx[TargetOlsIdx]], and vps_ols_dpb_bitdepth_minus8[MultiLayeredOlsIdx[TargetOlsIdx]] of the VPS, respectively.

Additionally, for example, referring to Table 5, when VCL HRD parameters or NAL HRD parameters are present, each value of cpb_size_value_minus1[tIdTarget][j] of a j-th CPB of a vps_ols_hrd_idx[MultiLayeredOlsIdx[targetOlsIdx]]-th entry, within a list of ols_hrd_parameters( ) syntax structures within all SPS NAL units being referred to by an i-th layer and ols_hrd_parameters( ) syntax structures within all referenced VPS NAL units, may be re-written (or re-configured) so as to correspond to SubpicCpbSizeVcl[SubpicSetLevelIdx][subpicIdx] and SubpicCpbSizeNal[SubpicSetLevelIdx][subpicIdx] that are derived by Equation D.5 and Equation D.6, respectively, and SubpicBitrateVcl[SubpicSetLevelIdx][subpicIdx] and SubpicBitrateNal[SubpicSetLevelIdx] [subpicIdx] that are derived by Equation D.7 and Equation D.8, respectively. Herein, SubpicSetLevelIdx may be derived by a subpicture for Equation D.10 having a same sub-picture index as subpicIdx, j may be within a range from 0 to hrd_cpb_cnt_minus1, and i may be within a range from 0 to NumLayersInOls [targetOlsIdx]-1. Meanwhile, the Equations D.5, D.6, D.7, D.8, and D.10 may be the same as disclosed in the VVC standard.

Additionally, for example, referring to Table 5, when sli_cbr_constraint_flag is equal to 1, all NAL units having nal_unit_type that is equal to FD_NUT and filler payload SEI messages that are not associated with the VCL NAL units of a subpicture in may be removed. And, a j-th CPB cbr_flag[tIdTarget][j] of a vps_ols_hrd_idx[MultiLayeredOlsIdx[targetOlsIdx]]-th entry, within a list of ols_hrd_parameters( ) syntax structures of all references VPS NAL units and SPS NAL units, may be set (or configured) to equal to 1. Herein, j may be within a range of 0 to hrd_cpb_cnt_minus1. And, otherwise, i.e., when sli_cbr_constraint_flag is equal to 0, all NAL units having nal_unit_type that is equal to FD_NUT and filler payload SEI messages may be removed, and cbr_flag[tIdTarget][j] may be set to 0.

Figure 4:
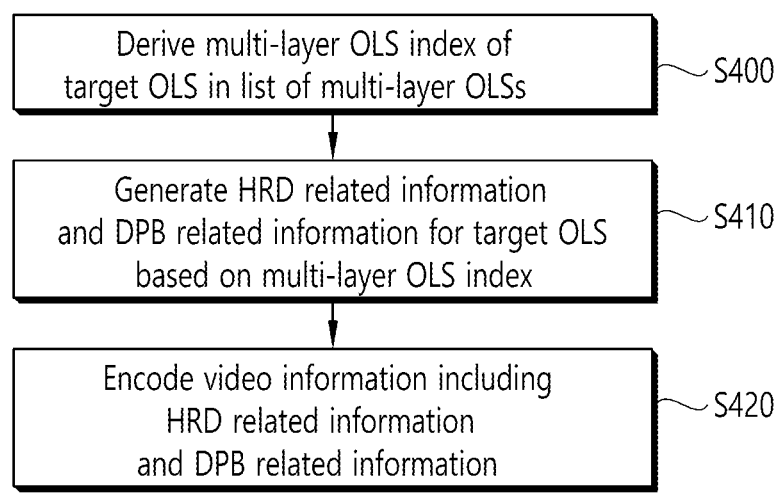
FIG. 4 briefly illustrates an image encoding method performed by an encoding apparatus according to the present disclosure.

FIG. 4 briefly illustrates an image encoding method performed by an encoding apparatus according to the present disclosure. The method disclosed in FIG. 4 may be performed by the encoding apparatus that is disclosed in FIG. 2. More specifically, for example, S400 to S420 of FIG. 4 may be performed by the entropy encoder of the encoding apparatus. And, although it is not shown in the drawing, a procedure of performing a DPB management process may be performed by the DPB of the encoding apparatus, and a procedure for decoding a current picture may be performed by the predictor and residual processor of the encoding apparatus.

The encoding apparatus derives a multi-layer Output Layer Set (OLS) index of a target OLS in a list of multi-layer OLSs (S400). The encoding apparatus may derive a multi-layer OLS index of a target OLS in a list of multi-layer Output Layer sets (OLSs). Herein, for example, the multi-layer OLSs may be OLSs including a plurality of layers. Additionally, for example, the target OLS may be one of the multi-layer OLSs.

For example, the encoding apparatus may derive the multi-layer OLS index as shown in the above-described Table 4. For example, in case the target OLS is an n-th OLS among the multi-layer OLSs, a multi-layer OLS index of the target OLS may be derived as n−1. For example, when the target OLS, which is an i-th OLS among all OLSs, is an n-th OLS among the multi-layer OLSs, the multi-layer OLS index (MultiLayeredOlsIdx[i]) of the target OLS may be derived as n−1.

The encoding apparatus generates Hypothetical Reference Decoder (HRD) related information and Decoded Picture Buffer (DPB) related information for the target OLS based on the multi-layer OLS index (S410). The encoding apparatus may decode/encode a picture within the target OLS and may derive an HRD parameter and/or DPB parameter for the target OLS. Additionally, the encoding apparatus may generate and encode the HRD related information on the HRD parameter and/or the DPB related information on the DPB parameter. For example, the encoding apparatus may derive the HRD parameter and/or the DPB parameter for a DPB management process.

For example, the HRD related information and/or DPB related information may include vps_ols_dpb_pic_width[MultiLayeredOlsIdx[TargetOlsIdx]], vps_ols_dpb_pic_height[MultiLayeredOlsIdx[TargetOlsIdx]], vps_ols_dpb_chroma_format[MultiLayeredOlsIdx[TargetOlsIdx]], vps_ols_dpb_bitdepth_minus8[MultiLayeredOlsIdx[TargetOlsIdx]], vps_ols_dpb_params_idx[MultiLayeredOlsIdx[TargetOlsIdx]], and/or vps_ols_hrd_idx[MultiLayeredOlsIdx[TargetOlsIdx]].

For example, the HRD related information may include an HRD index for an HRD parameter syntax structure of the target OLS. The HRD parameter syntax structure may be a syntax structure for the HRD parameter of the target OLS. The HRD index may be an HRD index for the multi-layer index. For example, the HRD index may indicate an HRD parameter syntax structure of the target OLS. A syntax element of the HRD index may be the above-described vps_ols_hrd_idx[MultiLayeredOlsIdx[TargetOlsIdx]].

For example, the encoding apparatus may generate the HRD parameter syntax structure of the target OLS and generate the HRD index indicating the HRD parameter syntax structure of the target OLS.

Additionally, for example, the DPB related information may include a syntax element for a width of a Decoded Picture Buffer (DPB) for the target OLS, a syntax element for a height of the DPB, a syntax element for a chroma format of the DPB, a syntax element for a bit depth of the DPB, and/or a DPB index for a DPB parameter syntax structure of the target OLS. The DPB related information may be syntax elements for the multi-layer index. For example, the DPB index may indicate a DPB parameter syntax structure of the target OLS. A syntax element on a width of the DPB may be the above-described vps_ols_dpb_pic_width[MultiLayeredOlsIdx[TargetOlsIdx]], a syntax element on a height of the DPB may be the above-described vps_ols_dpb_pic_height[MultiLayeredOlsIdx[TargetOlsIdx]], a syntax element on a chroma format of the DPB may be the above-described vps_ols_dpb_chroma_format[MultiLayeredOlsIdx[TargetOlsIdx]], a syntax element on a bit depth of the DPB may be the above-described vps_ols_dpb_bitdepth_minus8[MultiLayeredOlsIdx[TargetOlsIdx]], and a syntax element of the DPB index may be the above-described vps_ols_dpb_params_idx[MultiLayeredOlsIdx[TargetOlsIdx]].

For example, the encoding apparatus may derive DPB parameters of the target OLS and may generate the DPB related information for the DPB parameters.

Meanwhile, for example, the encoding apparatus may perform a DPB management process based on the HRD parameter and/or the DPB parameter. For example, the encoding apparatus may perform a picture management process for a decoded picture of the DPB based on the HRD parameter and/or the DPB parameter. For example, the encoding apparatus may add a decoded picture to the DPB, or the encoding apparatus may remove a decoded picture within the DPB. For example, a decoded picture within the DPB may be used as a reference picture of inter prediction for a picture within the target OLS, or the decoded picture within the DPB may be used as an output picture. The decoded picture may denote a picture that has been decoded before a current picture according to the decoding order within the target OLS.

The encoding apparatus encodes video information including the HRD related information and the DPB related information (S420). The encoding apparatus may encode the HRD related information and/or the DPB related information. Video information may include the HRD related information and/or the DPB related information.

Meanwhile, the encoding apparatus may decode a picture of the target OLS. Additionally, for example, the encoding apparatus may update the DPB based on the HRD related information and/or DPB related information for the target OLS. For example, the encoding apparatus may perform a DPB management process for a decoded picture of the DPB based on the HRD related information and/or DPB related information. For example, the encoding apparatus may add a decoded picture to the DPB, or the encoding apparatus may remove a decoded picture within the DPB. For example, a decoded picture within the DPB may be used as a reference picture of inter prediction for a picture within the target OLS, or the decoded picture within the DPB may be used as an output picture. The decoded picture may denote a picture that has been decoded before a current picture according to the decoding order within the target OLS.

Additionally, for example, the encoding apparatus may decode a picture of the target OLS based on the DPB. For example, the encoding apparatus may perform inter prediction on a block within the picture based on a reference picture of the DPB, so as to derive prediction samples, and, then, the encoding apparatus may generate reconstructed samples and/or a reconstructed picture for the picture based on the prediction samples. Meanwhile, for example, the encoding apparatus may derive residual samples in a block within the picture and may generate reconstructed samples and/or a reconstructed picture by adding the prediction samples and the residual samples.

Meanwhile, for example, the encoding apparatus may generate and encode prediction information on a block of a picture of the target OLS. In this case, various prediction method that are disclosed in the present disclosure, such as inter prediction or intra prediction, and so on, may be applied. For example, the encoding apparatus may determine whether to perform inter prediction or whether to perform intra prediction on the block, and the encoding apparatus may also determine a specific inter prediction mode or a specific intra prediction mode based on an RD cost. And, according to the determined mode, the encoding apparatus may derive prediction samples for the block. The prediction information may include prediction mode information for the block. The video information may include the prediction information.

Additionally, for example, the encoding apparatus may include residual information on a block of the current picture.

For example, the encoding apparatus may derive the residual samples through a subtraction of original samples and predictions samples corresponding to the block.

Thereafter, for example, the encoding apparatus may quantize the residual samples, so as to derive quantized residual samples. Then, the encoding apparatus may derive transform coefficients based on the quantized residual samples and may generate and encode the residual information based on the transform coefficients. Alternatively, for example, the encoding apparatus may quantize the residual samples so as to derive quantized residual samples, and, then, the encoding apparatus may transform the quantized residual samples, so as to derive transform coefficients. Thereafter, the encoding apparatus may generate and encode the residual information based on the transform coefficients. The video information may include the residual information. Alternatively, for example, the encoding apparatus may encode the video information and output the encoded video information in a bitstream format.

The encoding apparatus may generate reconstructed samples and/or a reconstructed picture through an addition of the prediction samples and the residual samples. Thereafter, as described above, an in-loop filtering procedure, such as deblocking filtering, SAO, and/or ALF procedures, may be applied to the reconstructed samples as needed, in order to enhance subjective/objective picture quality.

Meanwhile, a bitstream including the video information may be transmitted to the decoding apparatus through a network or a (digital) storage medium. Herein, the network may include a broadcast network and/or a communication network, and so on, and the digital storage medium may include various storage media, such as USB, SD, CD, DVD, Blu-ray, HDD, SSD, and so on.

Figure 5:
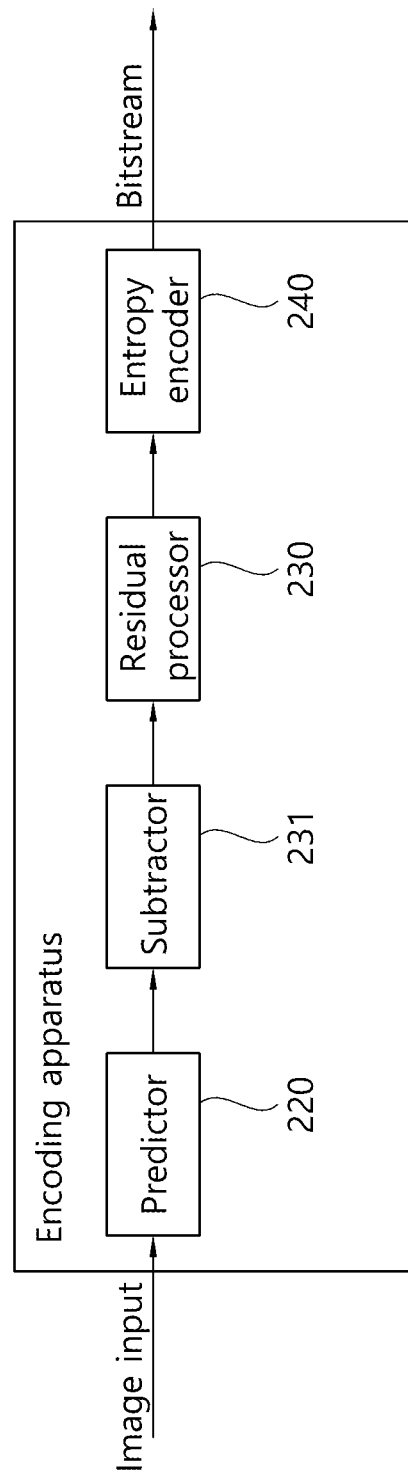
FIG. 5 briefly illustrates an encoding apparatus for performing an image encoding method according to the present disclosure.

FIG. 5 briefly illustrates an encoding apparatus for performing an image encoding method according to the present disclosure. The method disclosed in FIG. 4 may be performed by the encoding apparatus that is disclosed in FIG. 5. More specifically, for example, the entropy encoder of the encoding apparatus of FIG. 5 may perform S400 to S420 of FIG. 4. And, although it is not shown in the drawing, a procedure of performing a DPB management process may be performed by the DPB of the encoding apparatus, and a procedure for decoding a current picture may be performed by the predictor and residual processor of the encoding apparatus.

Figure 6:
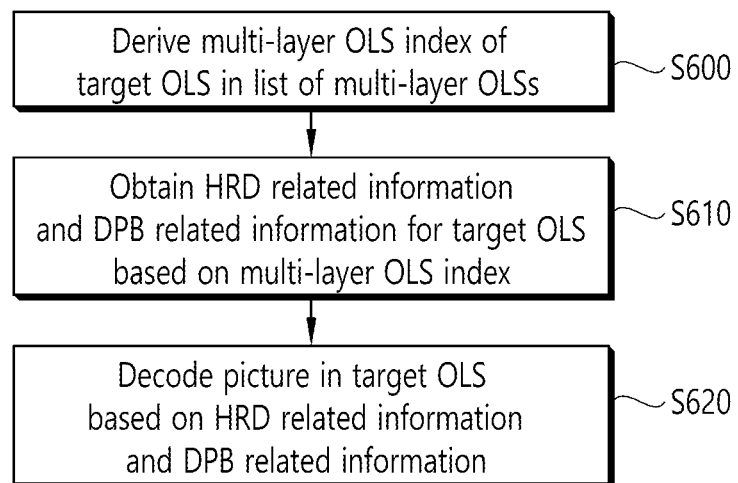
FIG. 6 briefly illustrates an image decoding method performed by a decoding apparatus according to the present disclosure.

FIG. 6 briefly illustrates an image decoding method performed by a decoding apparatus according to the present disclosure. The method disclosed in FIG. 6 may be performed by the decoding apparatus that is disclosed in FIG. 3. More specifically, for example, S600 to S610 of FIG. 6 may be performed by the entropy decoder of the decoding apparatus, and S620 of FIG. 6 may be performed by the DPB, predictor, and residual processor of the decoding apparatus.

The decoding apparatus derives a multi-layer Output Layer Set (OLS) index of a target OLS in a list of multi-layer OLSs (S600). The decoding apparatus may derive a multi-layer OLS index of a target OS from a list of multi-layer OLSs. Herein, for example, the multi-layer OLSs may be OLSs including a plurality of layers. And, for example, the target OLS may be one of the multi-layer OLSs.

For example, the decoding apparatus may derive the multi-layer OLS index as shown in the above-described Table 4. For example, in case the target OLS is an n-th OLS among the multi-layer OLSs, a multi-layer OLS index of the target OLS may be derived as n−1. For example, when the target OLS, which is an i-th OLS among all OLSs, is an n-th OLS among the multi-layer OLSs, the multi-layer OLS index (MultiLayeredOlsIdx[i]) of the target OLS may be derived as n−1.

The decoding apparatus obtains Hypothetical Reference Decoder (HRD) related information and Decoded Picture Buffer (DPB) related information for the target OLS based on the multi-layer OLS index (S610). The decoding apparatus may obtain information related to a Hypothetical Reference Decoder (HRD) and information related to a Decoded Picture Buffer (DPB) for the target OLS based on the multi-layer OLS index.

For example, the decoding apparatus may obtain information related to HRD and/or information related to DPB for the multi-layer index. For example, the information related to HRD and/or information related to DPB may include vps_ols_dpb_pic_width[MultiLayeredOlsIdx[TargetOlsIdx]], vps_ols_dpb_pic_height[MultiLayeredOlsIdx[TargetOlsIdx]], vps_ols_dpb_chroma_format[MultiLayeredOlsIdx[TargetOlsIdx]], vps_ols_dpb_bitdepth_minus8[MultiLayeredOlsIdx[TargetOlsIdx]], vps_ols_dpb_params_idx[MultiLayeredOlsIdx[TargetOlsIdx]], and/or vps_ols_hrd_idx[MultiLayeredOlsIdx[TargetOlsIdx]].

For example, the HRD related information may include an HRD index for an HRD parameter syntax structure of the target OLS. The HRD index may be an HRD index for the multi-layer index. For example, the HRD index may indicate an HRD parameter syntax structure of the target OLS. A syntax element of the HRD index may be the above-described vps_ols_hrd_idx[MultiLayeredOlsIdx[TargetOlsIdx]].

Additionally, for example, the DPB related information may include a syntax element for a width of a Decoded Picture Buffer (DPB) for the target OLS, a syntax element for a height of the DPB, a syntax element for a chroma format of the DPB, a syntax element for a bit depth of the DPB, and/or a DPB index for a DPB parameter syntax structure of the target OLS. The DPB related information may be syntax elements for the multi-layer index. For example, the DPB index may indicate a DPB parameter syntax structure of the target OLS. A syntax element on a width of the DPB may be the above-described vps_ols_dpb_pic_width[MultiLayeredOlsIdx[TargetOlsIdx]], a syntax element on a height of the DPB may be the above-described vps_ols_dpb_pic_height[MultiLayeredOlsIdx[TargetOlsIdx]], a syntax element on a chroma format of the DPB may be the above-described vps_ols_dpb_chroma_format[MultiLayeredOlsIdx[TargetOlsIdx]], a syntax element on a bit depth of the DPB may be the above-described vps_ols_dpb_bitdepth_minus8[MultiLayeredOlsIdx[TargetOlsIdx]], and a syntax element of the DPB index may be the above-described vps_ols_dpb_params_idx[MultiLayeredOlsIdx[TargetOlsIdx]].

The decoding apparatus decodes a picture in the target OLS based on the HRD related information and the DPB related information (S620).

For example, the decoding apparatus may derive an HRD parameter for the target OLS based on the HRD related information. For example, the decoding apparatus may derive an HRD parameter of the target OLS based on the HRD parameter syntax structure of the target OLS that is derived based on the HRD index. Additionally, for example, the decoding apparatus may derive a DPB parameter for the target OLS based on the DPB related information.

For example, the decoding apparatus may perform a DPM management process for a Decoded Picture Buffer (DPB) based on the HRD parameter and/or the DPB parameter for the target OLS. For example, the decoding apparatus may perform a picture management process for a decoded picture of the DPB based on the HRD parameter and/or the DPB parameter. For example, the decoding apparatus may add a decoded picture to the DPB, or the decoding apparatus may remove a decoded picture within the DPB. For example, a decoded picture within the DPB may be used as a reference picture of inter prediction for a picture within the target OLS, or the decoded picture within the DPB may be used as an output picture. The decoded picture may denote a picture that has been decoded before a current picture according to the decoding order within the target OLS.

For example, the decoding apparatus may decode a picture within the target OLS based on a DPB in which the DPB management process has been performed. For example, the decoding apparatus may perform inter prediction on a block within the picture based on a reference picture of the DPB, so as to derive prediction samples, and, then, the decoding apparatus may generate reconstructed samples and/or a reconstructed picture for the picture based on the prediction samples. Meanwhile, for example, the decoding apparatus may derive residual samples in a block within the picture based on residual information that is received through a bitstream and may generate reconstructed samples and/or a reconstructed picture by adding the prediction samples and the residual samples.

Thereafter, an in-loop filtering procedure, such as deblocking filtering, SAO, and/or ALF procedures, may be applied to the reconstructed samples as needed, in order to enhance subjective/objective picture quality.

Figure 7:
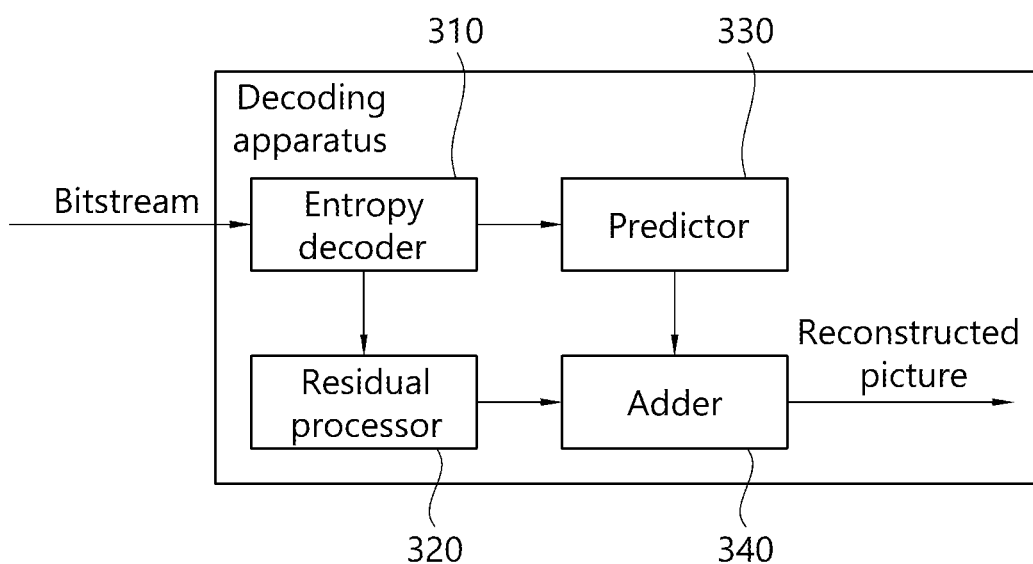
FIG. 7 briefly illustrates a decoding apparatus for performing an image decoding method according to the present disclosure.

FIG. 7 briefly illustrates a decoding apparatus for performing an image decoding method according to the present disclosure. The method disclosed in FIG. 6 may be performed by the decoding apparatus that is disclosed in FIG. 7. More specifically, for example, the entropy decoder of the decoding apparatus of FIG. 7 may perform S600 to S610 of FIG. 6, and the DPB, predictor, and residual processor of the decoding apparatus of FIG. 7 may perform S620 of FIG. 6.

As described above, according to the present disclosure, the signaling of HRD related information and DPB related information may be efficiently performed by deriving indexes of a list of multi-layer OLSs among all OLSs. And, thus, the overall coding efficiency may be enhanced.

Additionally, according to the present disclosure, the mapping of HRD related information and DPB related information that are signaled only for multi-layer OLSs to a wrong (or incorrect) OLS may be prevented by deriving indexes of a list of multi-layer OLSs among all OLSs. And, thus, the overall coding efficiency may be enhanced.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 8:
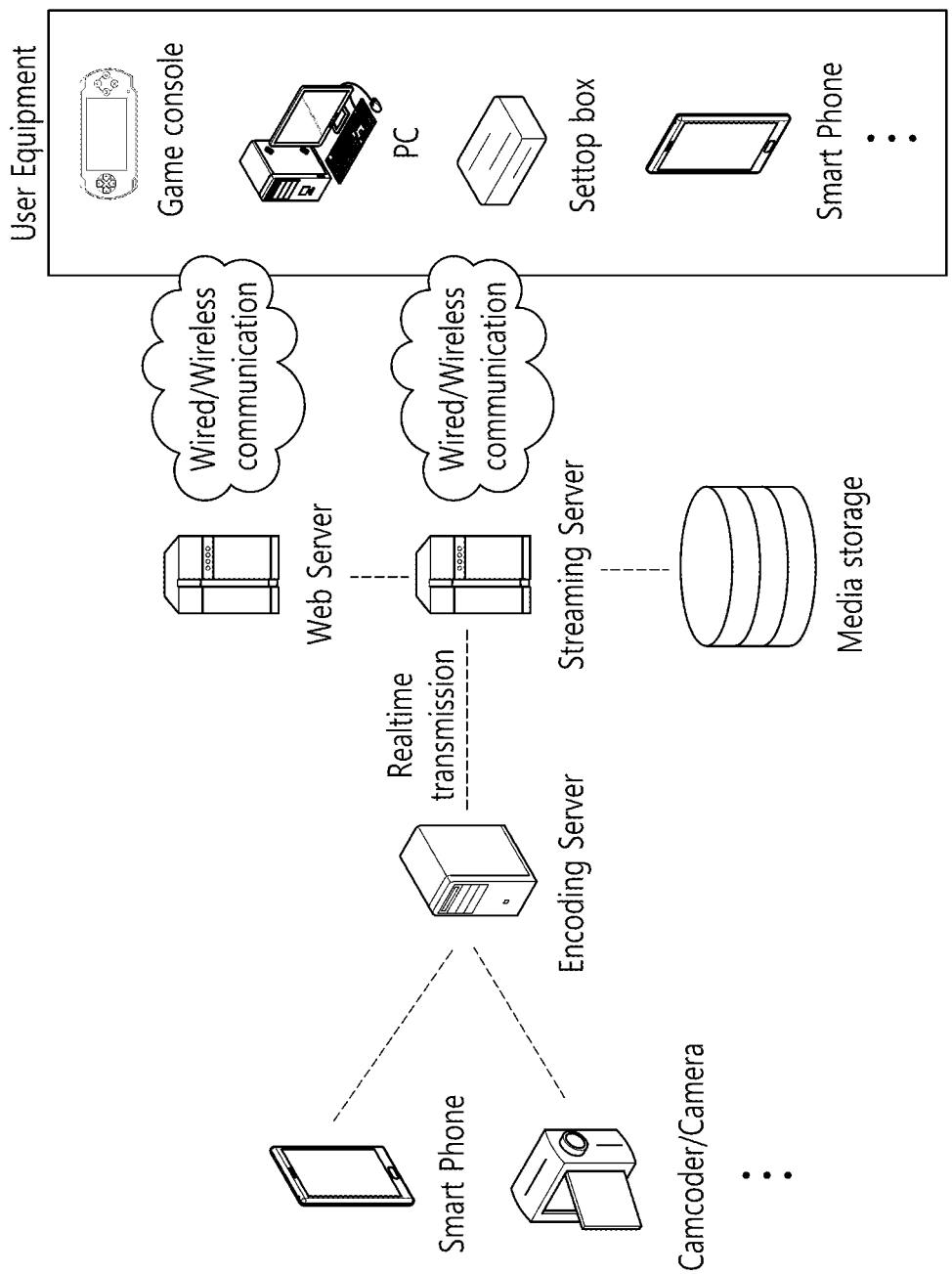
FIG. 8 illustrates a structural diagram of a contents streaming system to which the present disclosure is applied.

FIG. 8 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. A decoding apparatus for image decoding, the decoding apparatus comprising:
   a memory; and
   at least one processor connected to the memory, the at least one processor configured to:

derive a multi-layer Output Layer Set (OLS) index of a target OLS in a list of multi-layer OLSs by mapping a target OLS index in a list of all OLSs to the multi-layer OLS index in the list of the multi-layer OLSs, wherein the target OLS is specified by the target OLS index in the list of the all OLSs, wherein the multi-layer OLSs are OLSs including more than one layer, and wherein the target OLS is one of the multi-layer OLSs;

obtain Hypothetical Reference Decoder (HRD) related information and Decoded Picture Buffer (DPB) related information for the target OLS based on the multi-layer OLS index; and decode a picture in the target OLS based on the HRD related information and the DPB related information.

2. The decoding apparatus of claim 1, wherein the HRD related information includes an HRD index for an HRD parameter syntax structure of the target OLS.

3. The decoding apparatus of claim 2, wherein decoding the picture in the target OLS comprises, decoding the picture in the target OLS based on the HRD related information and the DPB related information; and deriving an HRD parameter of the target OLS based on the HRD parameter syntax structure of the target OLS derived based on the HRD index.

4. The decoding apparatus of claim 1, wherein the DPB related information includes a syntax element for a width of a Decoded Picture Buffer (DPB) for the target OLS, a syntax element for a height of the DPB, a syntax element for a chroma format of the DPB, a syntax element for a bit depth of the DPB, and a DPB index for a DPB parameter syntax structure of the target OLS.

5. The decoding apparatus of claim 4, wherein decoding the picture in the target OLS comprises, deriving a DPB parameter of the target OLS based on the DPB related information.

6. An encoding apparatus for image encoding, the encoding apparatus comprising:

a memory; and at least one processor connected to the memory, the at least one processor configured to:

derive a multi-layer Output Layer Set (OLS) index of a target OLS in a list of multi-layer OLSs by mapping a target OLS index in a list of all OLSs to the multi-layer OLS index in the list of the multi-layer OLSs, wherein the target OLS is specified by the target OLS index in the list of the all OLSs, wherein the multi-layer OLSs are OLSs including more than one layer, and wherein the target OLS is one of the multi-layer OLSs;

generate Hypothetical Reference Decoder (HRD) related information and Decoded Picture Buffer (DPB) related information for the target OLS based on the multi-layer OLS index; and encode video information including the HRD related information and the DPB related information.

7. The encoding apparatus of claim 6, wherein the HRD related information includes an HRD index for an HRD parameter syntax structure of the target OLS.

8. The encoding apparatus of claim 7, wherein generating the HRD related information and the DPB related information for the target OLS comprises, generating the HRD parameter syntax structure of the target OLS; and generating the HRD index indicating the HRD parameter syntax structure of the target OLS.

9. The encoding apparatus of claim 6, wherein the DPB related information includes a syntax element for a width of a Decoded Picture Buffer (DPB) for the target OLS, a syntax element for a height of the DPB, a syntax element for a chroma format of the DPB, a syntax element for a bit depth of the DPB, and a DPB index for a DPB parameter syntax structure of the target OLS.

10. The encoding apparatus of claim 9, wherein generating the HRD related information and the DPB related information for the target OLS comprises, deriving a DPB parameter of the target OLS; and generating the DPB related information for the DPB parameter.

11. An apparatus for transmitting data for an image, the apparatus comprising:

at least one processor configured to obtain a bitstream of the image information, wherein the image information is generated by deriving a multi-layer Output Layer Set (OLS) index of a target OLS in a list of multi-layer OLSs by mapping a target OLS index in a list of all OLSs to the multi-layer OLS index in the list of the multi-layer OLSs, wherein the target OLS is specified by the target OLS index in the list of the all OLSs, wherein the multi-layer OLSs are OLSs including more than one layer, and wherein the target OLS is one of the multi-layer OLSs; generating Hypothetical Reference Decoder (HRD) related information and Decoded Picture Buffer (DPB) related information for the target OLS based on the multi-layer OLS index; and encoding the image information including the HRD related information and the DPB related information; and a transmitter configured to transmit the data including the bitstream of the image information.

* * * * *